US012053973B2

(12) United States Patent
Terrero et al.

(10) Patent No.: US 12,053,973 B2
(45) Date of Patent: Aug. 6, 2024

(54) ACTIVE SHEET-EDGE AIRFLOW CONTROL FOR VACUUM CONVEYORS WITH MAGNET ASSIST

(71) Applicant: Xerox Corporation, Norwalk, CT (US)

(72) Inventors: Carlos M. Terrero, Ontario, NY (US); Brian J. Dunham, Webster, NY (US); Michael T. Leckinger, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 188 days.

(21) Appl. No.: 17/815,724

(22) Filed: Jul. 28, 2022

(65) Prior Publication Data

US 2023/0278352 A1 Sep. 7, 2023

Related U.S. Application Data

(63) Continuation-in-part of application No. 17/653,687, filed on Mar. 7, 2022, now Pat. No. 11,932,008, and a continuation-in-part of application No. 17/653,686, filed on Mar. 7, 2022.

(51) Int. Cl.
*B41J 11/00* (2006.01)

(52) U.S. Cl.
CPC ................................ *B41J 11/0085* (2013.01)

(58) Field of Classification Search
CPC ........ B41J 11/0085; B41J 11/06; B41J 11/007
See application file for complete search history.

(56) References Cited

U.S. PATENT DOCUMENTS 7,980,558 B2 7/2011 Moore et al.
8,157,369 B2 4/2012 Hoover et al.

*Primary Examiner* — Justin Seo
*Assistant Examiner* — Tracey M McMillion
(74) *Attorney, Agent, or Firm* — Simpson & Simpson, PLLC

(57) ABSTRACT

A valve assembly for controlling airflow along sheet edges on a vacuum transport assembly, the valve assembly including a flexible plate, including a first end, a second end, a first top surface, and a first bottom surface, and a first actuator connected to the second end and operatively arranged to displace the flexible plate. Added is at least one magnet member designed to assist in controlling the valve assembly.

20 Claims, 43 Drawing Sheets

ACTIVE SHEET-EDGE AIRFLOW CONTROL FOR VACUUM CONVEYORS WITH MAGNET ASSIST

CLAIM

This application claims priority to and the benefit of U.S. application Ser. No. 17/653,686, titled ACTIVE SHEET-EDGE AIRFLOW CONTROL FOR VACUUM CONVEYORS, filed on Mar. 7, 2022, and Ser. No. 17/653,687, also titled ACTIVE SHEET-EDGE AIRFLOW CONTROL FOR VACUUM CONVEYORS, filed on Mar. 7, 2022, which are incorporated herein by reference in their entirety.

FIELDS

The present disclosure relates to the field of printing systems, and more particularly, to an assembly that selectively controls the vacuum along sheet edges in a marker transport of a printing system having the addition of magnetic assists for controlling valve assemblies.

BACKGROUND

In some printing systems or devices, the marker transport is a vacuum conveyor system that transports sheets under one or more print heads. The marker transport comprises a perforated belt driven over a vacuum platen. Air is drawn through the belt and platen by a vacuum system. Once the sheet is acquired the vacuum system provides the necessary hold-down force to transport the sheets along the belt.

However, printing systems, for example direct-to-paper ink-jet systems using vacuum conveyors in the marking area are susceptible to airflow disturbances during printing. In certain printing systems wherein the outboard edge (edge closest to the operator) is registered and thus not exposed to vacuum, the inboard edge (edge furthest from the operator), trail edge, and lead edge are exposed to the airflow from the marker vacuum transport. In certain non-registered printing systems all edges (i.e., lead, trail, inboard, and outboard) are exposed to vacuum. The airflow affects the ink drop placement near the edges of the sheet resulting in degraded print quality. As shown in FIG. 1, displacement of the main drop and its satellites on sheet 1 results in an image blur near the exposed sheet edges, for example, inboard edge 2A, lead edge 2B, and trail edge 2D (outboard edge 2C is unaffected since this is a registered system and there is no airflow outboard of outboard edge 2C). Additionally, the ink droplets that are drawn into the vacuum belt holes may mark the edge of the sheet resulting in stack edge contamination. FIG. 2 shows stack 3 of sheets having stack edge 4, which is contaminated with ink.

Thus, there is a need for an assembly and method for controlling the vacuum to minimize or prevent the defects described above.

SUMMARY

According to aspects illustrated herein, there is provided a valve assembly for controlling airflow along sheet edges on a vacuum transport assembly, the valve assembly comprising a flexible plate, including a first end, a second end, a first top surface, and a first bottom surface, and a first actuator connected to the second end and operatively arranged to displace the flexible plate.

In some embodiments, the first actuator is a solenoid. In some embodiments, the second end is connected to a bracket, the bracket is connected to the solenoid and a shaft, and the solenoid is operatively arranged to rotate the second end about the shaft. In some embodiments, the first actuator is a motor. In some embodiments, the valve assembly further comprises a platen, including a second top surface, a second bottom surface, and one or more holes extending from the second bottom surface to the second top surface. In some embodiments, the first end connected to the second bottom surface. In some embodiments, the second end is connected to the second bottom surface. In some embodiments, in a closed state of the valve assembly, the first top surface is engaged with the second bottom surface to close the one or more holes, and in an open state of the valve assembly, the first top surface is disengaged from the second bottom surface such that the one or more holes are open.

In some embodiments, the valve assembly further comprises a gasket connected to the first top surface. In some embodiments, the valve assembly further comprising a valve adjustment assembly, including a fulcrum operatively arranged to engage the first bottom surface, and a second actuator operatively arranged to displace the fulcrum with respect to the flexible plate. In some embodiments, the valve adjustment assembly further comprises a carriage translatably connected to the second actuator, and the fulcrum is connected to the carriage. In some embodiments, the fulcrum is a roller. In some embodiments, the second actuator is a screw drive. In some embodiments, the flexible plate is a leaf spring.

According to aspects illustrated herein, there is provided a vacuum transport assembly, comprising a platen, including a first top surface, first bottom surface, and one or more through-holes, and a valve assembly, including a plate aligned with the one or more through-holes, the plate including a second top surface, a second bottom surface, a first end fixedly secured to the first bottom surface, and a second end, and a first actuator connected to the second end.

In some embodiments, the first actuator is operatively arranged to displace the plate relative to the first bottom surface.

In some embodiments, in a closed state of the valve assembly, the second top surface is engaged with the first bottom surface to close the one or more holes, and in an open state of the valve assembly, the second top surface is disengaged from the first bottom surface such that the one or more holes are open. In some embodiments, the vacuum transport assembly further comprises a valve adjustment assembly, including a fulcrum engaged with the second bottom surface, and a second actuator operatively arranged to displace the fulcrum with respect to the plate. In some embodiments, the fulcrum forces the plate into contact with the platen at a position along the plate such that a first portion of the plate extending from the first end to the position abuts against the first bottom surface, and a second portion of the plate extending from the position to the second end is displaceable with respect to the first bottom surface. In some embodiments, the first actuator is connected to the second end via a cam.

According to aspects illustrated herein, there is provided a method of controlling airflow along sheet edges on a vacuum transport assembly, the method comprising receiving information related to one or more sheets of a print job, disabling airflow at an inboard edge of the one or more sheets, disabling airflow at a lead edge of the one or more sheets, and disabling airflow at a trail edge of the one or more sheets.

In some embodiments, the step of disabling airflow at the inboard edge comprises closing holes in a platen of the vacuum transport assembly between the inboard edge and an inboard side of the platen. In some embodiments, the information is received from one or more sensors. In some embodiments, the information comprises a position of at least one sheet of the one or more sheets. In some embodiments, the information comprises a predetermined spacing between the one or more sheets during the print job. In some embodiments, the step of disabling airflow at the inboard edge of the one or more sheets comprises adjusting an active length of a valve assembly such that the active length is equal to a width of the one or more sheets. In some embodiments, the step of adjusting an active length of the valve assembly such that the active length is equal to a width of the one or more sheets comprises positioning a valve adjustment assembly along a valve assembly such that the valve adjustment assembly aligns with the inboard edge of the one or more sheets. In some embodiments, the step of disabling airflow at the lead edge of the one or more sheets comprises determining a location of the lead edge with respect to one or more holes in a platen of the vacuum transport assembly, closing the one or more holes just prior to the lead edge being aligned therewith, and closing the one or more holes when the lead edge is aligned therewith.

In some embodiments, the method further comprises, once the lead edge has surpassed the one or more holes, opening the one or more holes. In some embodiments, the step of disabling airflow at the trail edge of the one or more sheets comprises determining a location of the trail edge with respect to one or more holes in a platen of the vacuum transport assembly, closing the one or more holes just prior to the trail edge being aligned therewith, and closing the one or more holes when the trail edge is aligned therewith. In some embodiments, the method further comprises once the trail edge has surpassed the one or more holes, opening the one or more holes. In some embodiments, the method further comprises disabling airflow at an outboard edge of the one or more sheets. In some embodiments, the step of disabling airflow at the lead edge comprises closing the one or more holes in a platen via a valve assembly.

According to aspects illustrated herein, there is provided a system for controlling airflow along sheet edges during transport of one or more sheets of a print job, the system comprising one or more computer processors, one or more computer readable storage media, a vacuum transport assembly including a platen comprising a plurality of holes, a vacuum operatively arranged to create airflow through the plurality of holes, and a belt operatively arranged to carry the one or more sheets over the platen in a process direction, a valve assembly, and program instructions stored on the computer readable storage media for execution by at least one of the one or more computer processors, the program instructions comprising program instructions to receive information related to the one or more sheets, program instructions to disable airflow at an inboard edge of the one or more sheets, program instructions to disable airflow at a lead edge of the one or more sheets, and program instructions to disable airflow at a trail edge of the one or more sheets.

In some embodiments, the program instructions to disable the airflow at the inboard edge comprise closing a portion of the plurality of holes between the inboard edge and an inboard side of the platen. In some embodiments, the system further comprises one or more sensors, and the program instructions to receive information related to the one or more sheets comprise receiving a position of at least one sheet of the one or more sheets from the one or more sensors.

In some embodiments, the program instructions to disable airflow at the inboard edge of the one or more sheets comprise program instructions to adjust the active length of the valve assembly such that the active length is equal to a width of the one or more sheets. In some embodiments, the program instructions to disable airflow at the lead edge of the one or more sheets comprise program instructions to determine a location of the lead edge with respect to a first portion of the one or more holes, program instructions to close the first portion just prior to the lead edge being aligned with the first portion, and program instructions to close the first portion when the lead edge is aligned with the first portion. In some embodiments, the program instructions further comprise program instructions to, once the lead edge has surpassed the first portion, open the first portion. In some embodiments, the program instructions to disable airflow at the trail edge of the one or more sheets comprises program instructions to determine a location of the trail edge with respect to the one or more holes, program instructions to close the one or more holes just prior to the trail edge being aligned therewith, and program instructions to close the one or more holes when the trail edge is aligned therewith.

According to aspects illustrated herein, there is provided an assembly that selectively and actively blocks airflow under the print stations of a printing device. In some embodiments, the invention comprises a mechanism that blocks the airflow adjacent to the edges of the sheet as it is being printed. The mechanism blocks a fixed zone directly inboard of the paper edge for the entirety of the run. Simultaneously, the mechanism actively blocks a zone under the print stations immediately upstream or downstream of the leading or trailing edge, respectively. Once the leading or trailing edge of the sheet passes the print zone the mechanism unblocks the airflow to reestablish the vacuum "hold-down" force.

In some embodiments, the mechanism comprises a flexible leaf spring used as a valve and a translating pinch roller that sets the length of the valve. The roller moves to the inboard edge of the sheet and provides a pinch point preventing the leaf spring from separating from the platen inboard of the sheet. An actuator (e.g., solenoid, motor, etc.) will cause the leaf spring to separate from the platen outboard of the roller. The holes inboard of the roller will continue to be blocked as the holes outboard of the roller will selectively be blocked or unblocked by the actuation of the leaf spring. This will control the airflow to the partitioned areas on the platen.

In some embodiments, when the actuator is de-energized, the leaf spring is in the open position (i.e., separated from the platen) thereby allowing the air-ports of the platen to be open. When the actuator is energized, the leaf spring is in the closed position (i.e., abuts against the platen) and closes the air-ports. The pinch roller is displaceable in inboard and outboard depending on the sheet size, and controls the vacuum on the inboard edge of the sheet. Specifically, the pinch roller is moved to the location of the sheet inboard edge, such that the portion of the leaf spring inboard of the pinch roller closes the inboard ports. In some embodiments, the top surface of the leaf spring comprises a gasket to help seal the air flow through the air-ports in the platen when the leaf spring is in the closed position.

The assembly of the present disclosure comprises a flexible leaf spring material used as a valve to control vacuum of a long section of platen air-ports. The assembly of the present disclosure comprises a marking transport platen with unique pattern of air-ports and channels in fluid communication therewith, which allows partitions of the vacuum to be actively controlled. The assembly of the present disclosure provides a system with media or sheet tracking that moves with the sheet through the printing process. The sheet tracking provides simultaneous vacuum control for all exposed edges (i.e., lead, trail, inboard, and outboard edges) as it travels through the printing process.

The assembly of the present disclosure provides the following benefits: a single integrated mechanism that addresses blur at all exposed sheet edges; it reduces or eliminates any disturbance caused by airflow moving across the sheet (e.g., image blur, stack edge contamination, etc.), especially on glossy or waxy paper on which water-based ink is printed; it minimizes the loss of "hold-down" vacuum as vacuum is maintained on the majority of the sheet; it can be used within current printing systems and does not require a re-design of the marking transport belt; it reduces missing jets and thus purging and run cost (i.e., it reduces ink misting, the ink mist particles clog up the ink jets and require the printing device to be shut down in order to purge the jets); and, it reduces or eliminates ink being drawn through the vacuum system resulting in a reduction of contamination from ink.

In some embodiments, the assembly comprises two partitions per printing station and two leaf spring valves per print station, an actuator (e.g., solenoid) for each leaf spring, a pinch roller for each leaf spring, and a lead screw to position the pinch roller.

In some embodiments, the invention may be reconfigured for a center registered system, rather than an edge registered system, by having two translating pinch rollers and centering the actuator. The assembly comprises multiple partitions per print stations resulting in multiple leaf spring valves per print station, a motor mechanism actuating multiple valves (for example a single motor with a camshaft), and a translating mechanism (cable system, rack and pinion, etc.).

According to aspects illustrated herein, there is provided a mechanism comprising flexible shims or plates, a movable roller to adjust flexible length of the shim, and a camming device to flex the shims based on paper size and position on a vacuum platen. The shims are pulled tight against the bottom surface of the platen to block the airflow adjacent to the edges of the sheet as it is being printed. The movable roller prevents the shim from flexing and blocks a fixed zone directly inboard/outboard of the paper edge for the entirety of the run. Simultaneously, the camming device actively tightens the shims to block a zone under the print stations immediately upstream or downstream of the leading edge or trailing edge, respectively. Once the leading edge or trailing edge of the sheet passes the print zone, the camming device flexes the shim to unblock the airflow and reestablish the vacuum "hold-down" force. Benefits of the present disclosure include the ability to control the air flow at both the inboard edge of the vacuum platen, as well as the lead and trail edges of the media. The leaf spring concept is simple and efficient in providing bidirectional flow control in each leaf.

According to aspects illustrated herein, there is provided a valve assembly for a vacuum transport comprising a platen including a plurality of holes, a vacuum, and a belt, the valve assembly comprising a flexible plate connected to a bottom surface of the platen, and an actuator connected to the flexible plate, wherein the actuator is operatively arranged to displace the flexible plate to close and open the plurality of holes. In some embodiments, the valve assembly further comprises a valve adjustment assembly operatively arranged to adjust a fulcrum of the flexible plate. The valve adjustment assembly comprises a pinch roller or fulcrum rotatably connected to a bracket or carriage via a shaft. The pinch roller engages a bottom surface of the flexible plate. The bracket, and thus the pinch roller, is linearly displaceable via an actuator (e.g., leadscrew) such that when the leadscrew rotates the bracket translates linearly therealong. The valve adjustment assembly further comprises a guide shaft to which the bracket is slidably connected. In some embodiments, the valve adjustment assembly further comprises a spring connected to one or more shafts.

The valve assembly is operatively arranged to prevent edge blur by shutting off vacuum air flow through the platen under the print heads. The valve adjustment assembly adjusts the valve assembly based on the sheet size. In some embodiments, the valve adjustment assembly is connected to a plenum or vacuum container, which is connected to the marker transport assembly. The valve assembly is connected to the bottom surface of the platen. The platen is then connected to the plenum sealing the top thereof, at which point the valve adjustment assembly engages the valve.

Added are vacuum transport assembly embodiments that use magnets to aid in controlling valve assemblies. The additional embodiments include the platen including the second top surface; the second bottom surface; the first end fixedly secured to the first bottom surface; and the second end; and, the first second end connected to the second end, but include at least two or more magnet members arrayed longitudinally on each side of given rows. The magnet members are designed to assist closing the through-holes with the leaf valve assemblies when the leaf valve assemblies are engaged in a closed state. In these added embodiments, the at least two or more magnet members are designed to engage with the top surface of the valve assembly to draw the valve assembly toward the first bottom surface to close the one or more holes.

The added embodiments can be designed with many types of magnet members, represented by but not limited to, magnetic plug members, the magnet plug members which may further be disposed within magnet hole members to keep the magnet plug members substantially flush to the first bottom surface; magnetic strip members, the magnetic strip members which may further be deployed in slot members to the magnetic strip members substantially flush to the first bottom member; and magnet members designed as electromagnet members in the aforementioned or different dispositions. The electromagnet members may further be able to at least one or more of change strength and polarity. An associated method using the magnet members is disclosed herein.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
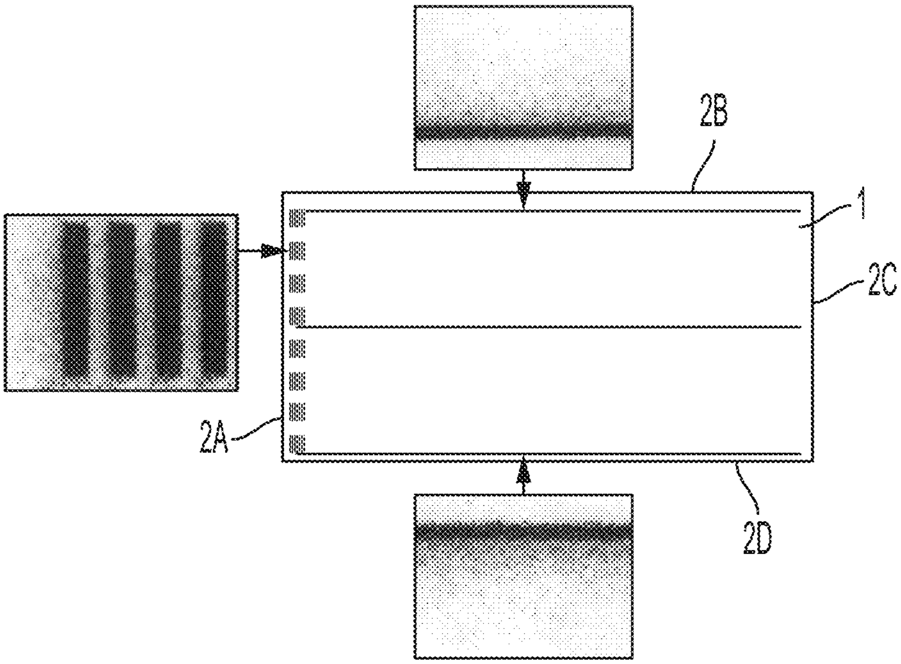
FIG. 1 shows detail views of defects on a printed sheet.
Figure 2:
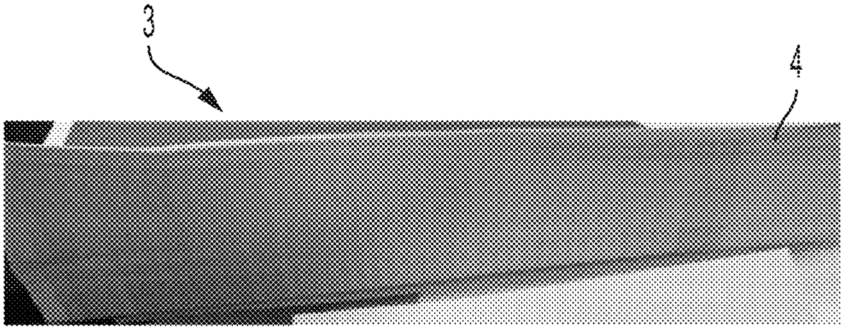
FIG. 2 shows a stack of sheets with a contaminated edge.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose.

As used herein, "sheet," "web," "substrate," "printable substrate," and "media" refer to, for example, paper, transparencies, parchment, film, fabric, plastic, photo-finishing papers, or other coated or non-coated substrate media in the form of a web upon which information or markings can be visualized and/or reproduced. By specialty sheet it is meant a sheet which includes a card, label, sticker, pressure seal envelopes, mailers, or other element that is thicker than the substrate on or in which it resides.

"Printed sheet" as used herein is a sheet on which an image is printed as part of the print job.

As used herein, "process direction" is intended to mean the direction of media transport through a printer or copier, while "cross process direction" is intended to mean the perpendicular to the direction of media transport through a printer or copier.

Figure 3A:
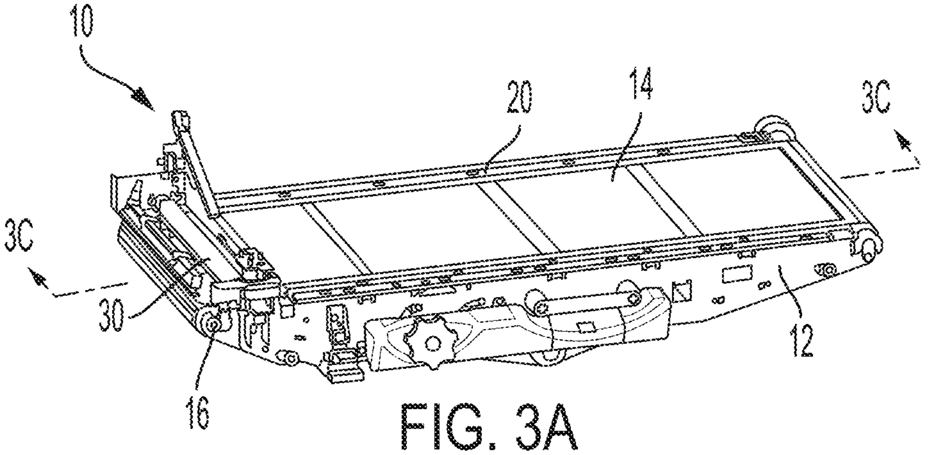
FIG. 3A is a perspective view of a vacuum transport assembly.
Figure 3B:
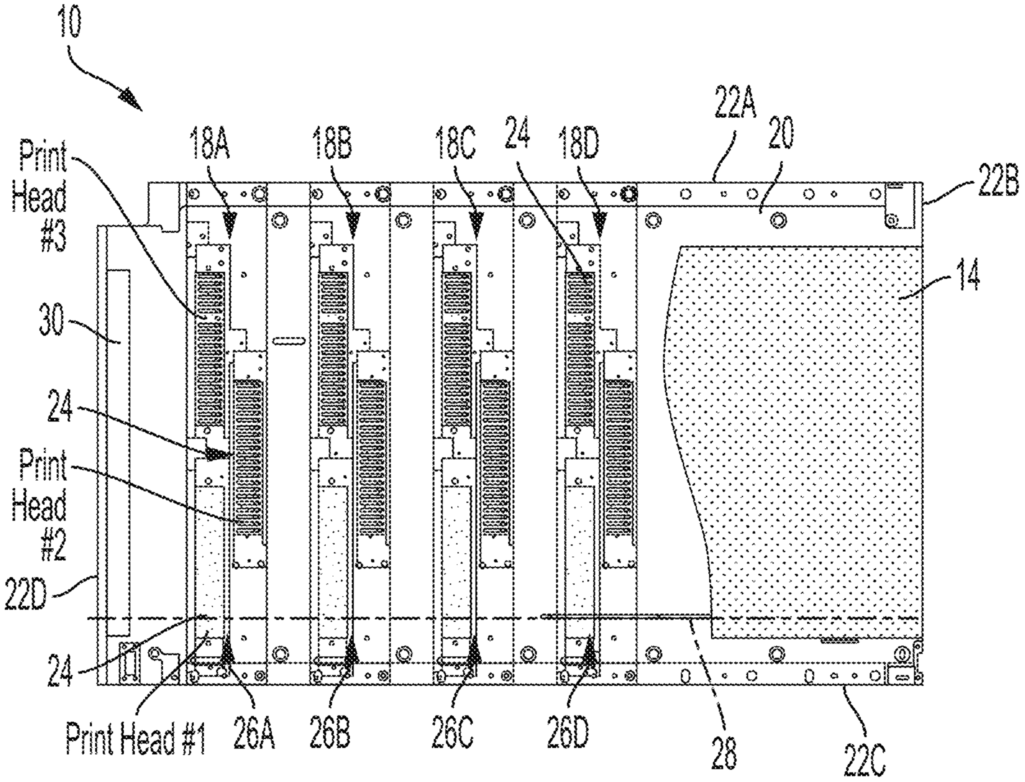
FIG. 3B is a partial top elevational view of the vacuum transport assembly shown in FIG. 3A.
Figure 3C:
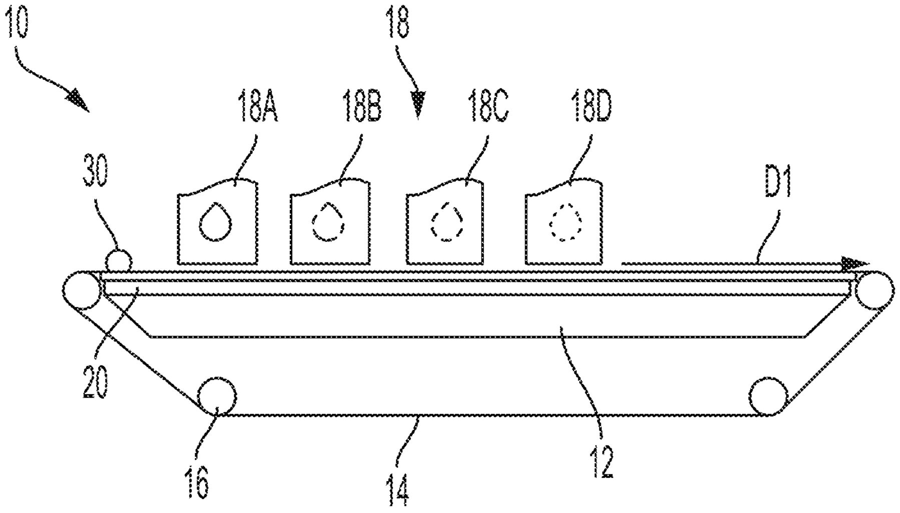
FIG. 3C is a simplified cross-sectional schematic view of the vacuum transport assembly taken generally along line 3C-3C in FIG. 3A.

Referring now to the figures, FIG. 3A is a perspective view of marker transport assembly 10. FIG. 3B is a partial top elevational view of marker transport assembly 10. FIG. 3C is a simplified cross-sectional schematic view of marker transport assembly 10 taken generally along line 3C-3C in FIG. 3A. Marker transport assembly 10 comprises vacuum 12, belt 14 arranged on a plurality of rollers 16, a plurality of marker modules 18, and a platen 20. Perforated belt 14 is driven over platen 20 by rollers 16 in process direction D1. Vacuum 12 is connected to platen 20 and draws air through belt 14 and platen 20 via a vacuum system. Platen 20 comprises inboard side 22A, lead side 22B, outboard side 22C, and trail side 22D, plurality of holes 24 through which air is drawn by vacuum 12. Marker modules 18 are arranged over platen 20 to apply ink to sheets (i.e., the printing process). In some embodiments, marker transport assembly 10 comprises marker modules 18A-D arranged over zones 26A-D of platen 20, respectively. Each of marker modules 18A-D may comprise one or more print heads. For example, marker module 18A comprises three print heads arranged over zone 26A. In each of zones 26A-D, holes 24 are arranged in two or more partitions or rows. For example, and as shown in FIG. 3B, the print head #1 and print head #3 are arranged over first partition of holes 24 and the print head #2 is arranged over second partition of holes 24. Once a sheet is acquired at acquisition roller 30, vacuum 12 provides the necessary hold-down force to transport sheets under marker modules 18A-D. The sheets are typically aligned on their outboard edge with registration edge 28. There are no holes 22 outboard of registration edge 28 in platen 20, and thus in registered printing systems the outboard edge of the sheet is not exposed to the airflow from vacuum 12.

Figure 4A:
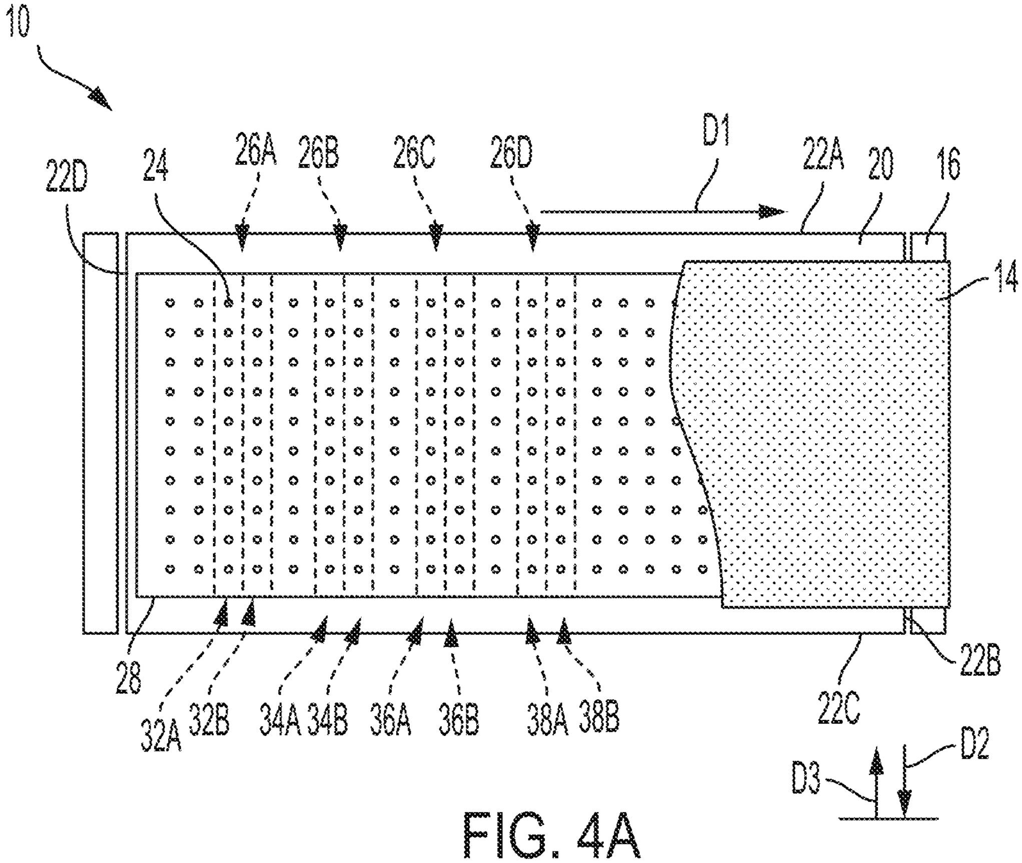
FIGS. 4A-O are partial top elevational views illustrating various states of holes in a platen of a vacuum transport assembly as sheets pass therealong.
Figure 4B:
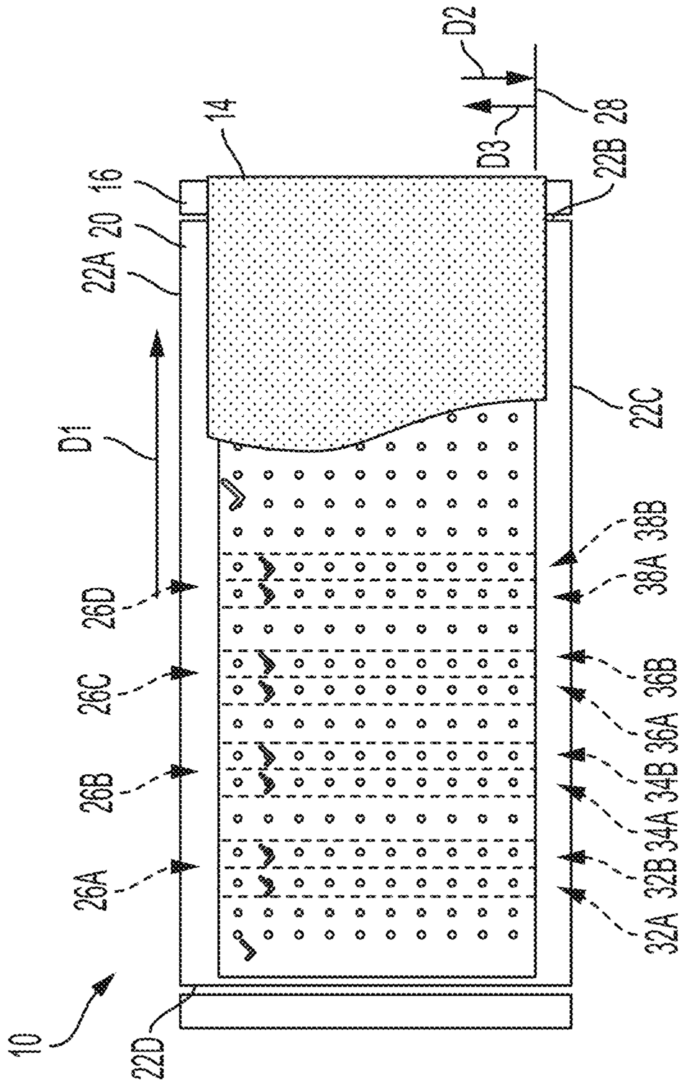
Figure 4C:
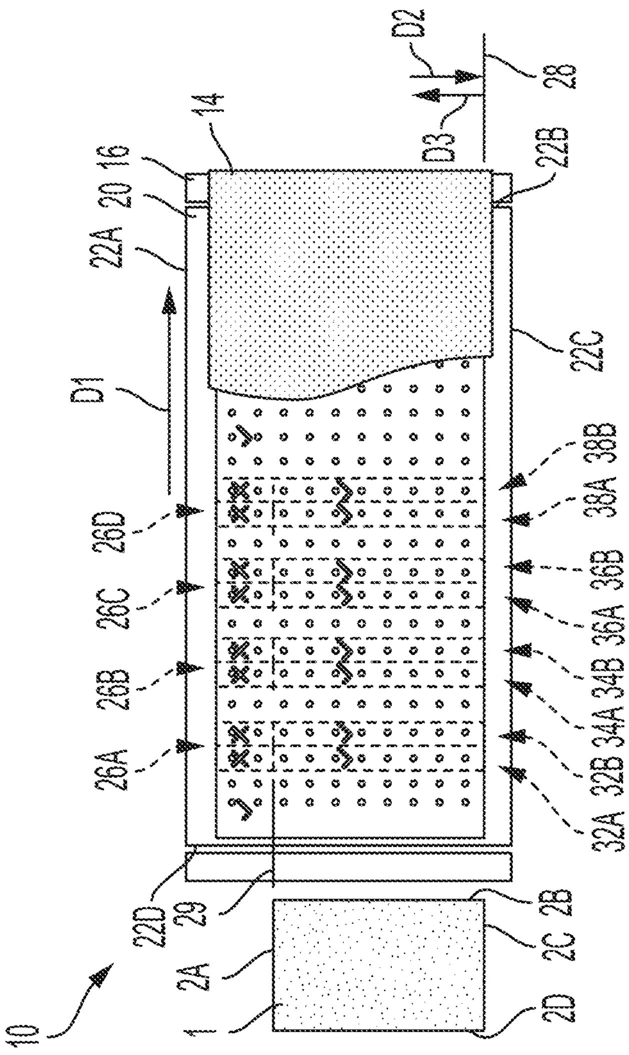
Figure 4D:
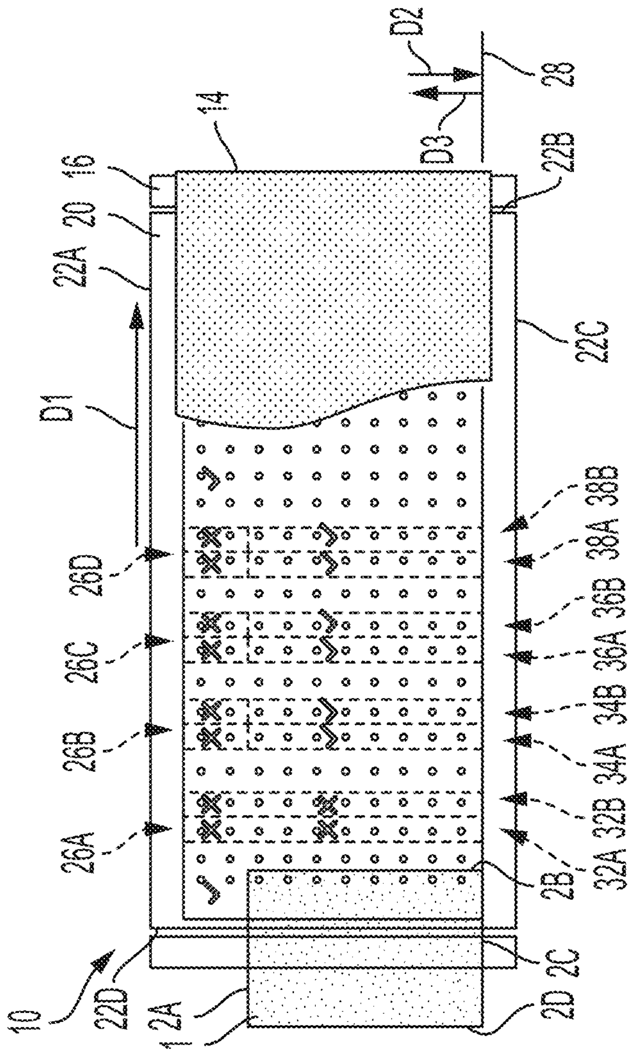
Figure 4E:
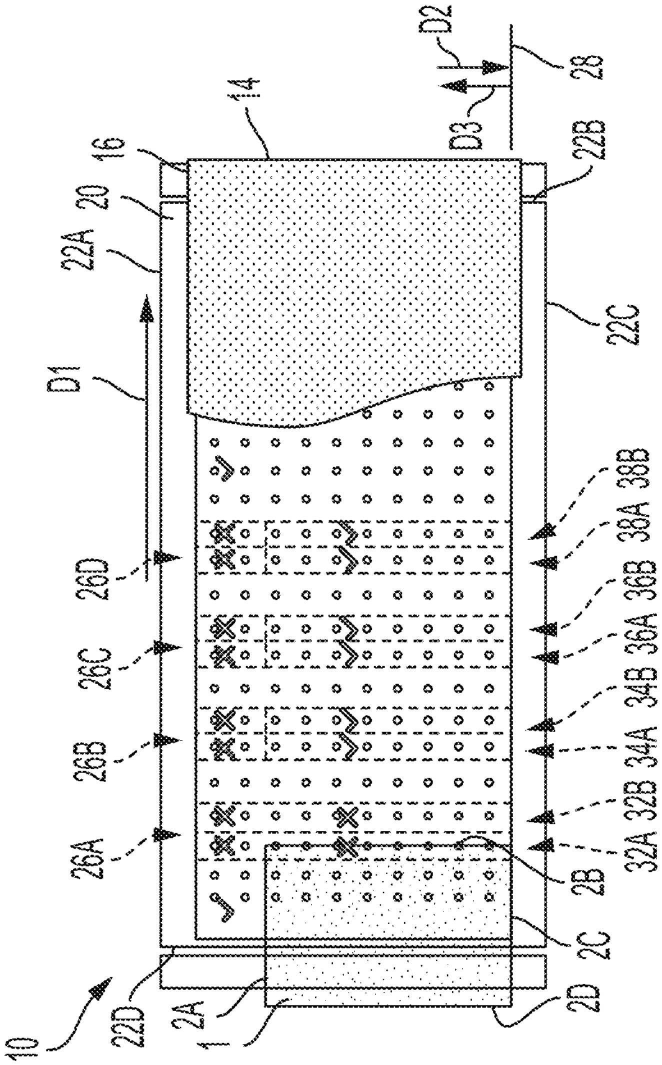
Figure 4F:
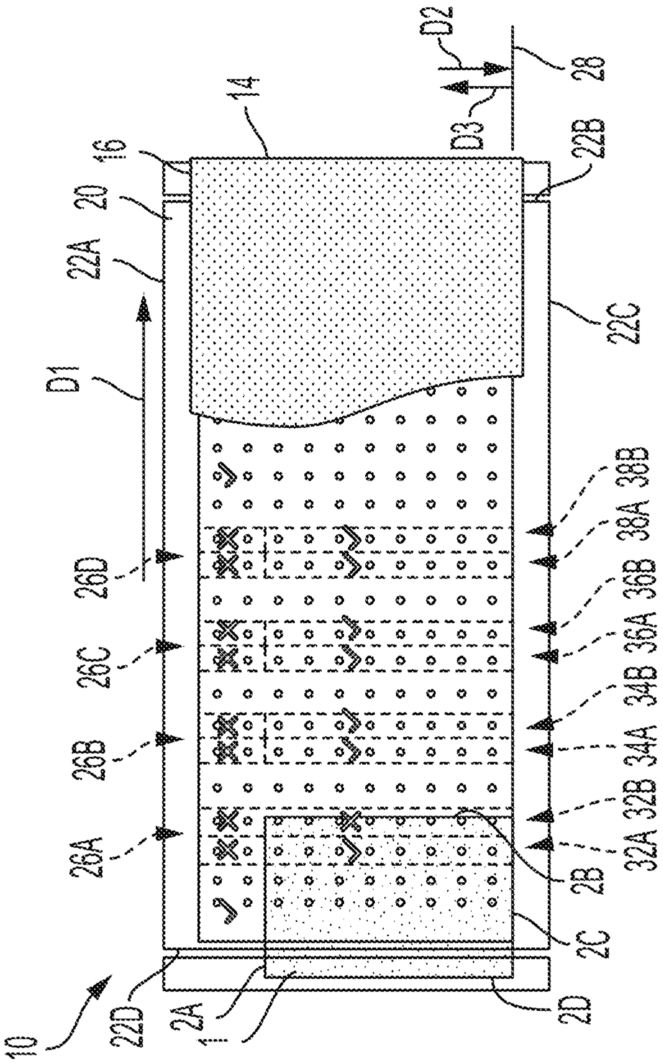
Figure 4G:
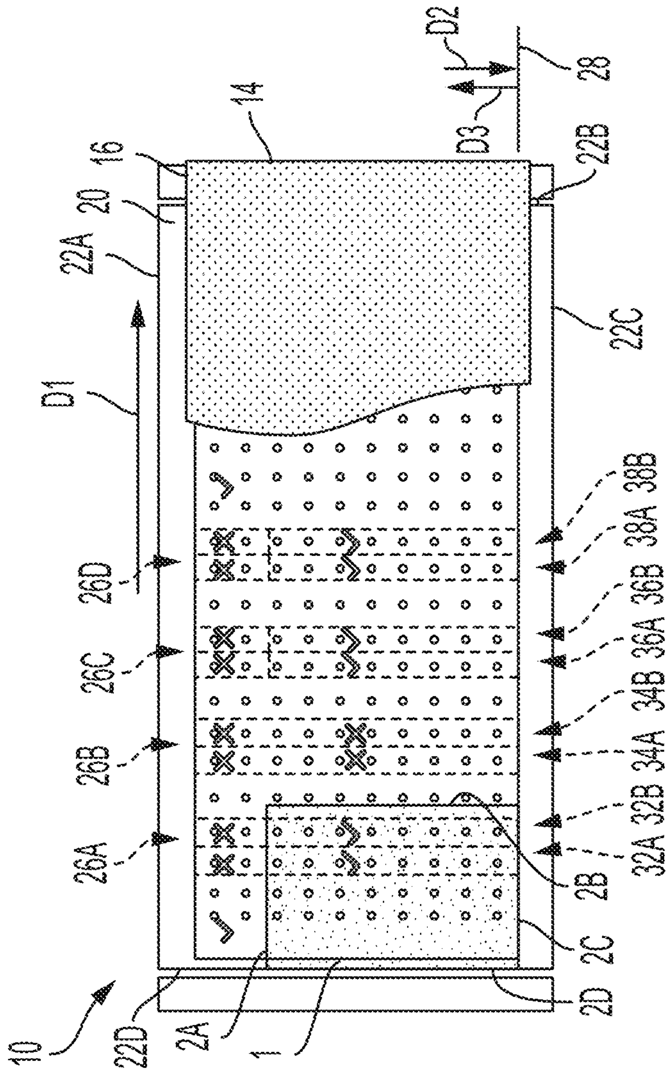
Figure 4H:
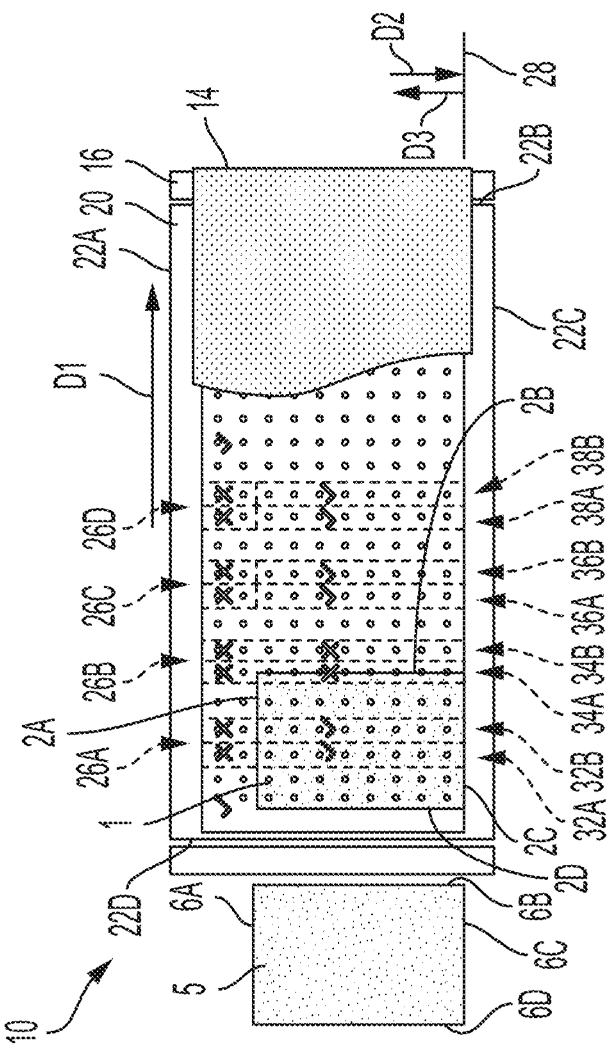
Figure 4I:
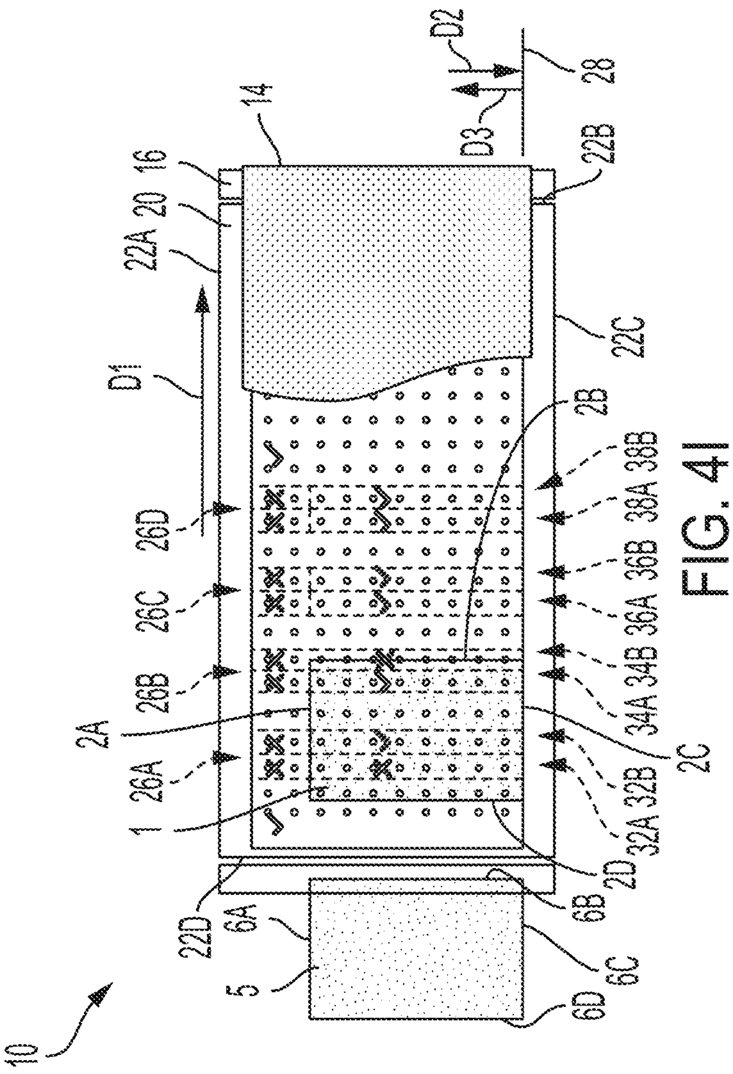
Figure 4J:
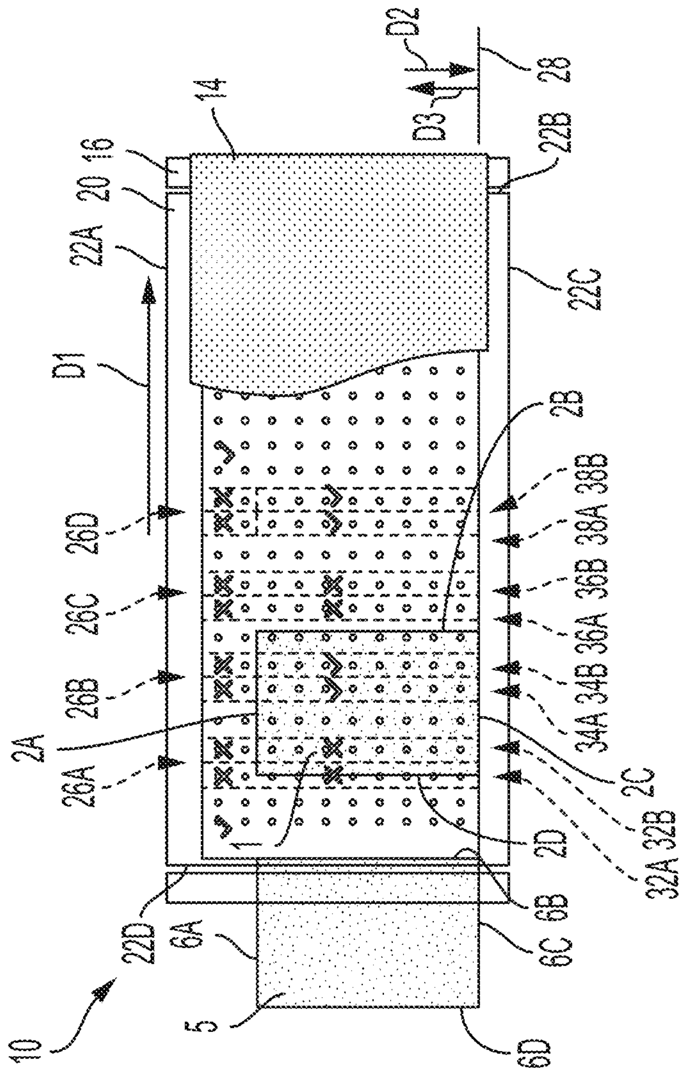
Figure 4K:
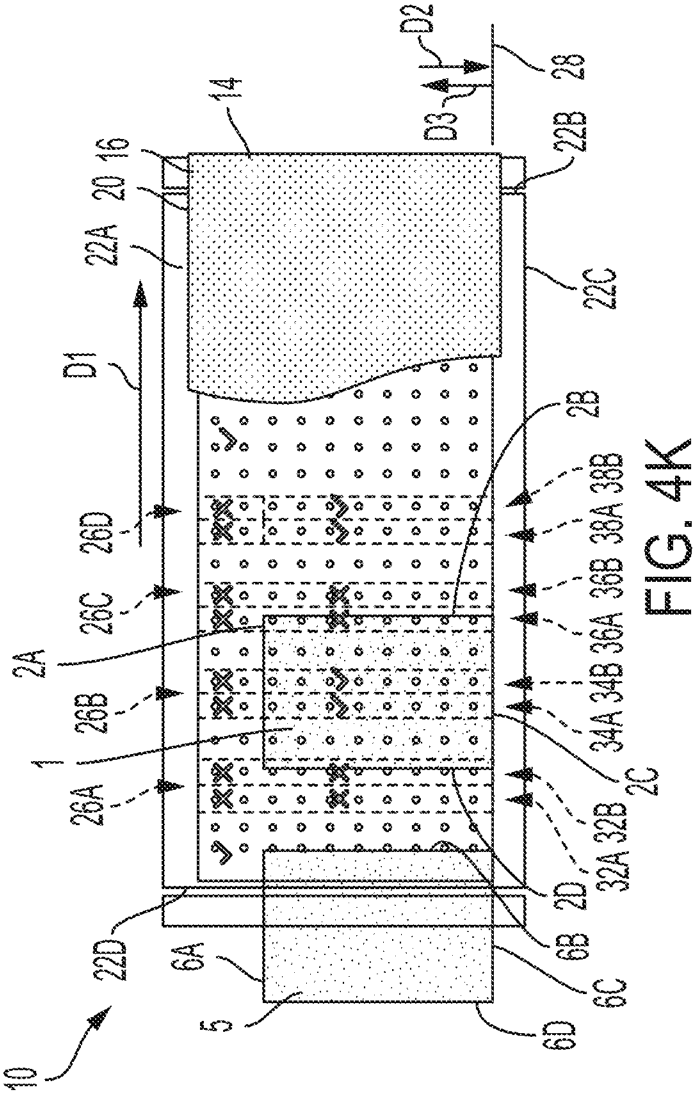
Figure 4L:
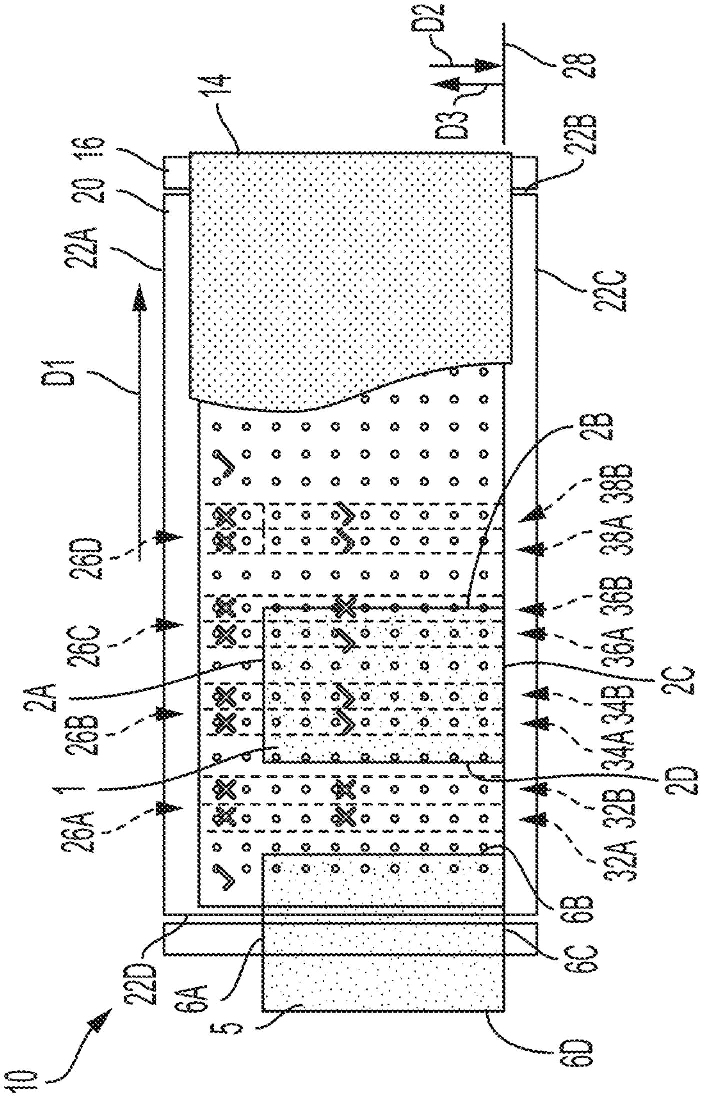
Figure 4M:
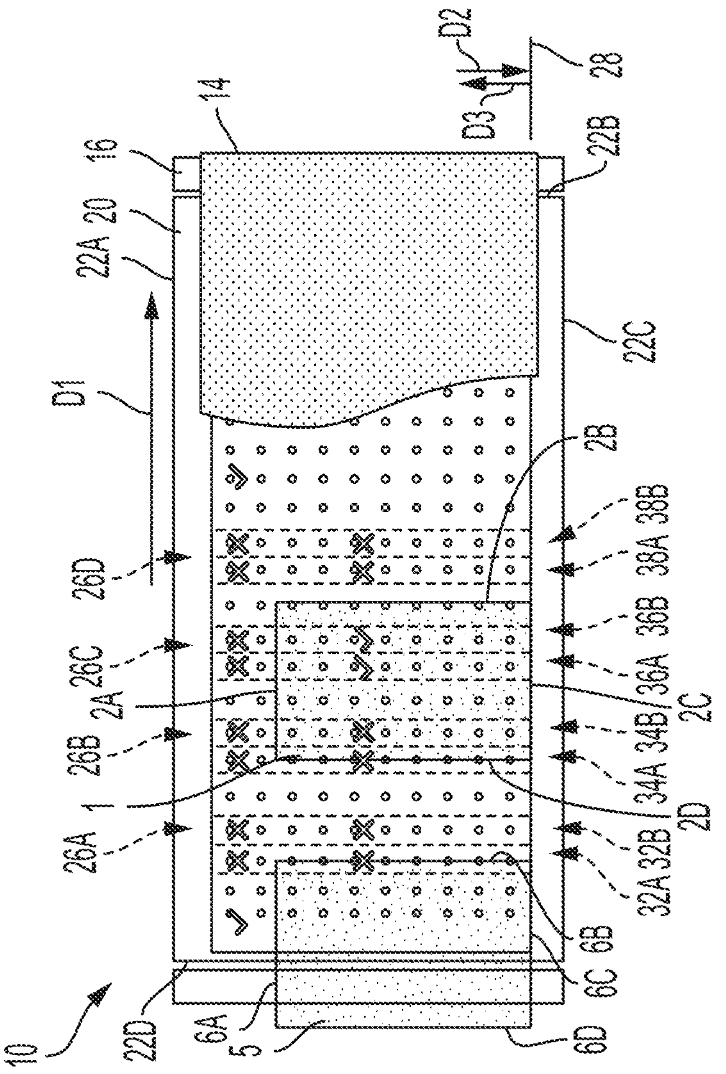
Figure 4N:
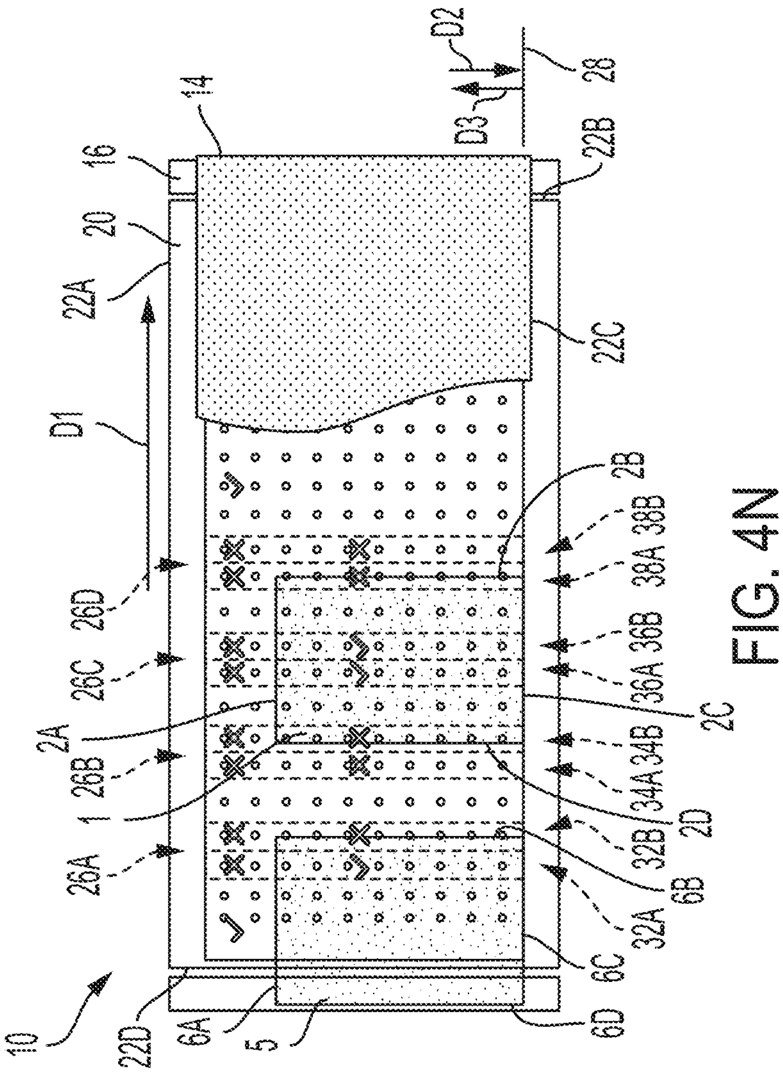
Figure 4O:
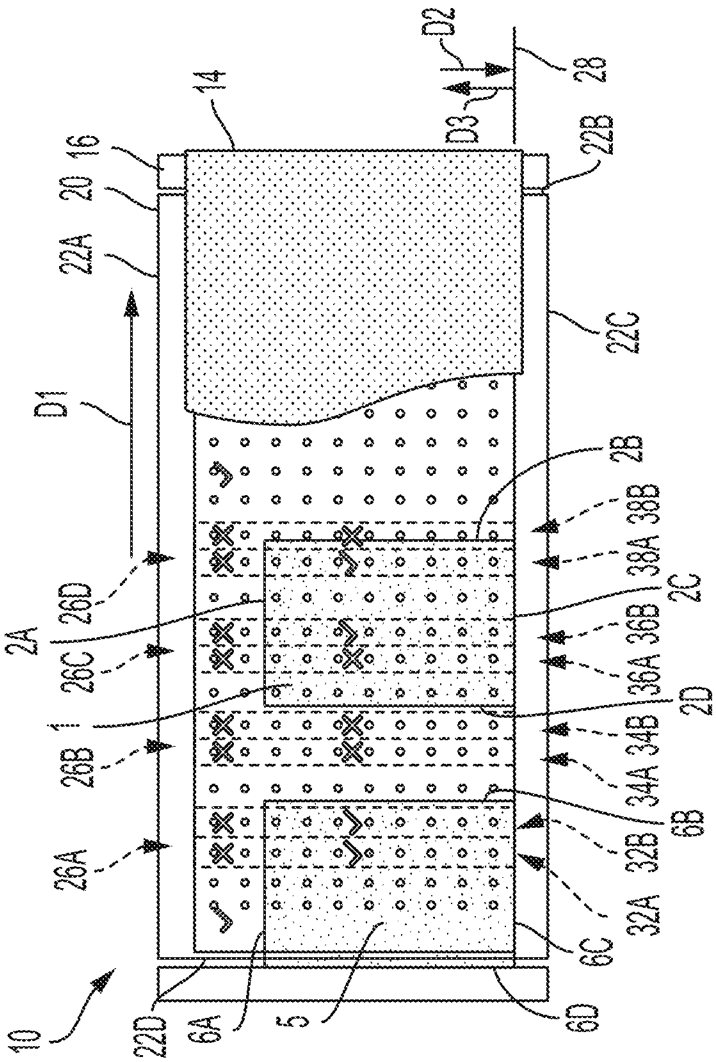

FIGS. 4A-O are partial top elevational views illustrating various states of holes 24 in platen 20 of vacuum transport assembly 10 as sheets 1, 5 pass therealong. Belt 14 is shown cutaway such that partitions 32A-38B can be seen more clearly. As previously described, one or more print heads are arranged over partitions 32A-38B. As a sheet passes along platen 20 via belt 14, and thus under marker modules 18A-D, it is an object of the present disclosure to stop the flow of air at the edges of the sheet under marker modules 18A-D. To do this, holes 24 are actively and selectively closed and opened, as will be described in greater detail below.

As shown in FIG. 4A, each of zones 26A-D comprises two rows or partitions of holes 24. "Partition" as used herein means one group or section of holes 24. Specifically, zone 26A includes partitions 32A-B, zone 26B includes partitions 34A-B, zone 26C includes partitions 36A-B, and zone 26D includes partitions 38A-B. While the partitions are shown in linear rows (i.e., holes 24 are linearly aligned), they may be arranged in any manner suitable for operation with valve assembly 50, for example, a curvilinear line or a geometric shape such as a square, triangle, rectangle, etc.

As shown in FIG. 4B, when no sheet is arranged on platen 20 or immediately incoming, all partitions are enabled, as indicated by check marks (✓). When a partition or a portion of the partition is enabled or turned on, holes 24 within that partition or portion are open, and thus air passes through those open holes enabling vacuum/suction. When a partition or a portion of the partition is disabled or shut off, the holes within that partition or portion are closed, and thus air does not pass through those closed holes disabling vacuum/suction. It should be appreciated that a portion of a partition may be enabled and a portion of the same partition may be disabled, as will be described in greater detail below.

When sheet 1 is immediately incoming, as shown in FIG. 4C, portions of partitions 32A-38B inboard of inboard edge 2A (i.e., the portion between inboard edge 2A and inboard side 22A, or line 29, in inboard direction D3) are disabled. The disabled portions of partitions 32A-38B are indicated by exes (X). By disabling these portions, a second registered edge is created at line 29, similar to that of registered edge 28. This is desirable in order to prevent the flow of air at inboard edge 2A as sheets pass along platen 20. To disable these portions, holes 24 in these portions are closed via leaf springs 52, specifically, by displacing fulcrums 82 in outboard direction D2 until they are aligned with inboard edge 2A, or line 29. Operation of valve assemblies 50 and valve adjustment assemblies 80 will be described in greater detail below. It should be appreciated that the portions of partitions 32A-38B inboard of line 29 will remain disabled for the duration of the print job, or until a different size sheet is to be printed, at which point fulcrums 82 will be adjusted, and thus line 29 moved, to the inboard edge of the different size sheet.

Just prior to lead edge 2B entering zone 26A, as shown in FIG. 4D, portions of partitions 32A-B between line 29 to registration edge 28 are disabled by closing holes 24 arranged therein. To shut off these portions, actuators 64 displace leaf springs 64 such that they abut against the bottom surface of platen 20 and prevent air from passing through holes 24 in those portions. Operation of leaf springs 52 and actuators 64 will be described in greater detail below.

Both partition 32A and partition 32B remain off when lead edge 2B is aligned with partition 32A, as shown in FIG. 4E. As shown in FIG. 4F, when lead edge 2B is aligned with partition 32B (i.e., lead edge 2B has surpassed partition 32A), partition 32A is turned on thereby enabling the vacuum through holes 24 therein. It is desirable that the partitions be enabled whenever possible to maintain as much vacuum/suction on sheet 1 as possible.

As shown in FIG. 4G, when lead edge 2B surpasses partition 32B, partition 32B is also turned on and thus vacuum through holes 24 in both partitions 32A-B are enabled. Additionally, portions of partitions 34A-B between line 29 and registered edge 28 are disabled in anticipation of lead edge 2B passing thereover (i.e., the vacuum/suction through holes 24 in partitions 34A-B is disabled).

As shown in FIG. 4H, lead edge 2B is aligned with partition 34A and thus partitions 34A-B remain disabled. Additionally, sheet 5 is shown as approaching platen 20.

As shown in FIG. 41, partition 32A is disabled as trail edge 2D approaches, but partition 32B remains enabled. Additionally, lead edge 2B is aligned with partition 34B and as such, partition 34B remains disabled and partition 34A is enabled.

As shown in FIG. 4J, lead edge 2B has surpassed partition 34B and as such, partition 34B is enabled. Trail edge 2D is aligned with partition 32A, which is still disabled.

Additionally, partition 32B is disabled in anticipation of alignment with trail edge 2D (i.e., partition 32B is disabled just prior to trail edge 2D passing thereover).

As shown in FIG. 4K, lead edge 2B is aligned with partition 36A, which is disabled. Partition 36B is also disabled in anticipation of alignment with lead edge 2B. Partitions 34A-B are enabled as no edges of sheet 1 are close to alignment therewith. Trail edge 2D is aligned with partition 32B, which is disabled. Additionally, partition 32A is disabled in anticipation of alignment with lead edge 6B of sheet 5.

As shown in FIG. 4L, lead edge 2B is aligned with partition 36B, which is disabled. Partitions 36A and 34A-B are enabled. Partitions 32A-B are disabled in anticipation of alignment with lead edge 6B.

As shown in FIG. 4M, lead edge 2B has surpassed partition 36B and thus partitions 36A-B are enabled. Partitions 38A-B are disabled in anticipation of alignment with lead edge 2B. Trail edge 2D is aligned with partition 34A and thus partitions 34A-B are disabled. Additionally, lead edge 6B is aligned with partition 32A and thus partitions 32A-B remain disabled.

As shown in FIG. 4N, lead edge 2B is aligned with partition 38A and thus partitions 38A-B remain disabled. Partitions 36A-B are enabled. Trail edge 2D is aligned with partition 34B, which is disabled. Lead edge 6B is aligned with partition 32B, which is disabled. Additionally, partition 34A is disabled in anticipation of alignment with lead edge 6B. Since lead edge 6B has surpassed partition 32A, partition 32A is enabled.

As shown in FIG. 4O, lead edge is aligned with partition 38B, which is disabled. Partitions 38A and 36B are enabled. Partition 36A is disabled in anticipation of alignment with trail edge 2D. Partitions 34A-B are disabled in anticipation of alignment with lead edge 6B. Lead edge 6B has surpassed partition 32B, and thus partitions 32A-B are enabled.

Figure 5:
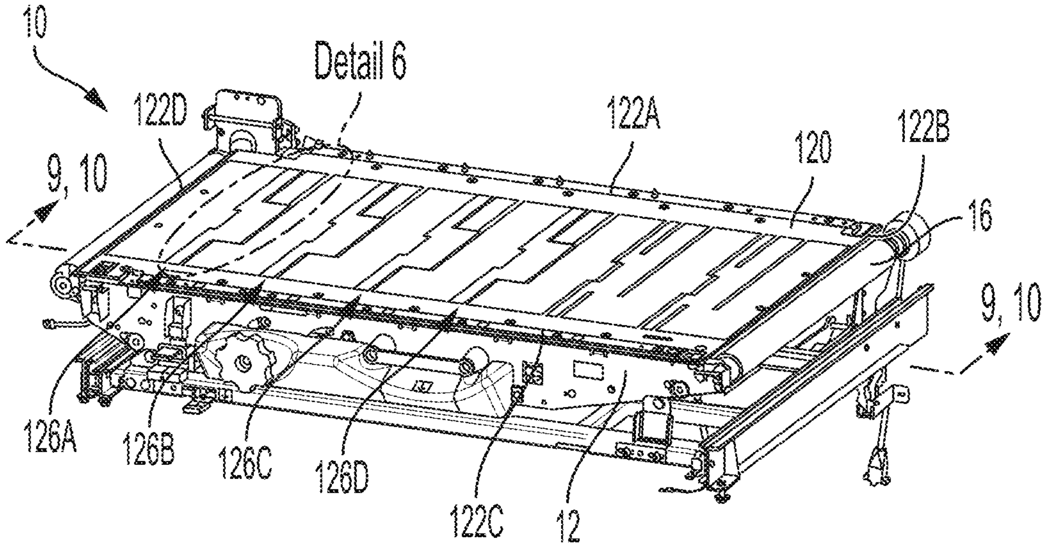
FIG. 5 is a perspective view of a vacuum transport assembly with the belt removed.
Figure 6:
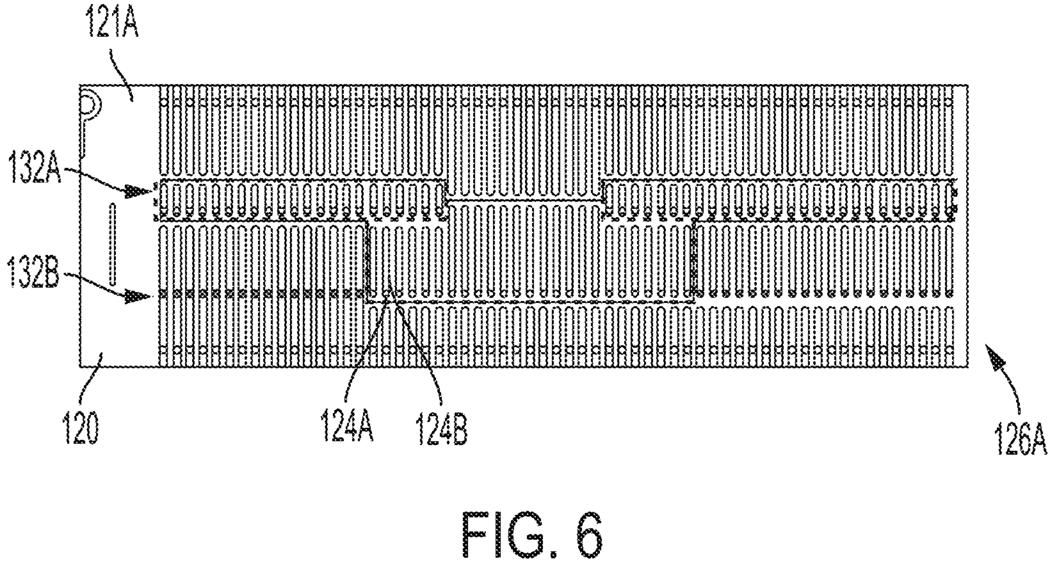
FIG. 6 is a detail view of the vacuum transport assembly taken generally along Detail 6 in FIG. 5.

FIG. 5 is a perspective view of vacuum transport assembly 10 with belt 14 removed for simplicity. FIG. 6 is a detail view of vacuum transport assembly 10 taken generally along Detail 6 in FIG. 5. Zones 126A-D demonstrate the target areas for air suction/vacuum shut off located under the print heads (refer to FIG. 3B for an example arrangement of print heads). Each zone, for example zone 126A, comprises a plurality of holes 124A in fluid communication with respective channels 124B. Channels 124B extend from top surface 121A of platen 120 at least partially to bottom surface 121B. Holes 124A extend from bottom surface 121B of platen 120 to channels 124B. Air is sucked from top surface 121A through channels 124B and then through holes 124A to an area under bottom surface 121B. As best shown in FIG. 6, in some embodiments, each channel 124B is in fluid communication with only one hole 124A such that, when said one hole 124A is closed, there is no airflow through the closed hole 124A or its respective channel 124B. This will be described in greater detail below. In some embodiments, each channel 124B is in fluid communication with a plurality of holes 124A. In some embodiments, each hole 124A is in fluid communication with a plurality of channels 124B.

Figure 7:
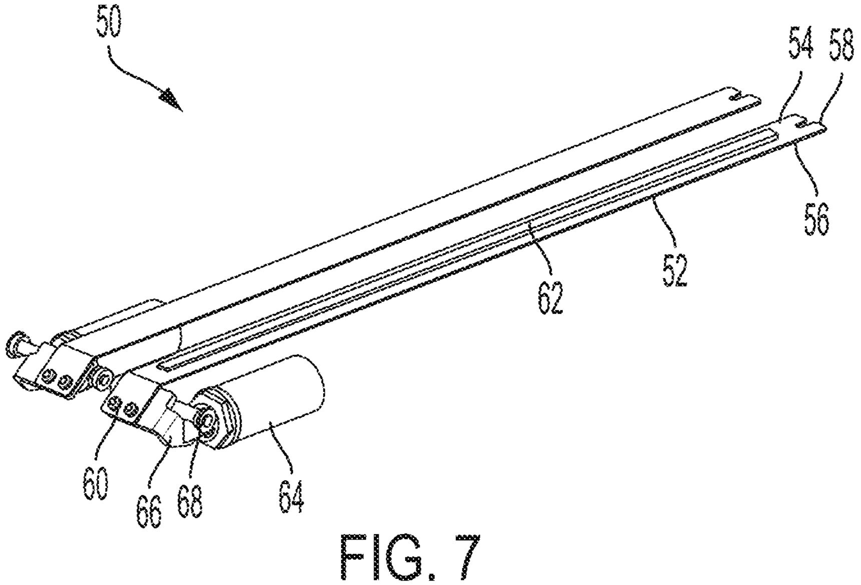
FIG. 7 is a perspective view of a valve assembly.

FIG. 7 is a perspective view of valve assembly 50. Valve assembly 50 generally comprises at least one leaf spring or valve or (flexible) plate 52 and actuator 64. In some embodiments, valve assembly 50 comprises two leaf springs 52, each connected to a respective actuator, operatively arranged to enable and disable partitions 132A-B (see FIG. 6).

Plate 52 comprises top surface 54, bottom surface 56, end 58, and end 60. Top surface 54 is operatively arranged to engage bottom surface 121B to open and close holes 124A to disable vacuum in a partition or a portion of a partition. In some embodiments, top surface 54 comprises gasket 62 to provide for a better seal between leaf spring 52 and platen 120 and thus closure of holes 124A. End 58 is connected, for example fixedly secured, to platen 120. In some embodiments, end 58 is connected to bottom surface 121B via connector or clamp or bar 72 (see FIGS. 9A-13). End 60 is connected to actuator 64, for example, via bracket 66 and/or shaft 68.

In some embodiments, and as best shown in FIG. 7, end 60 is arranged at an angle relative to bottom surface 56, for example at approximately 135 degrees. This angled portion is connected to bracket 66. Bracket 66 is connected to actuator 64, which is operatively arranged to rotate bracket 66 about an axis, for example shaft 68. For example, in some embodiments, actuator is a solenoid with a plunger that displaces linearly. The plunger is connected to bracket 66 and when plunger is displaced linearly, bracket 66 rotates about shaft 68. In some embodiments, and as will be describe in greater detail below, actuator 64 may comprise any actuation mechanism suitable for rotating end 68 about an axis (i.e., shaft 68), for example, a motor. Bracket 66, and specifically shaft 68, is rotatably connected to platen 120 via one or more brackets 70 (see FIGS. 11A-13).

In some embodiments, when actuator 64 is in a first state (e.g., de-energized), top surface 54 is separated from bottom surface 121B and holes 124A in the partition aligned with leaf spring 52 are open (i.e., the partition is enabled). When actuator 64 is in a second state (e.g., energized), top surface is engaged with and/or abuts against bottom surface 121B and holes 124A in the partition aligned with leaf spring 52 are closed (i.e., the partition is disabled). In some embodiments, leaf spring 52 is biased to the open position (i.e., holes 124A are open). In some embodiments, plate 52 is a flexible plate and is not biased to any position, but rather actuator engages and disengages plate 52 with bottom surface 121B.

Figure 8:
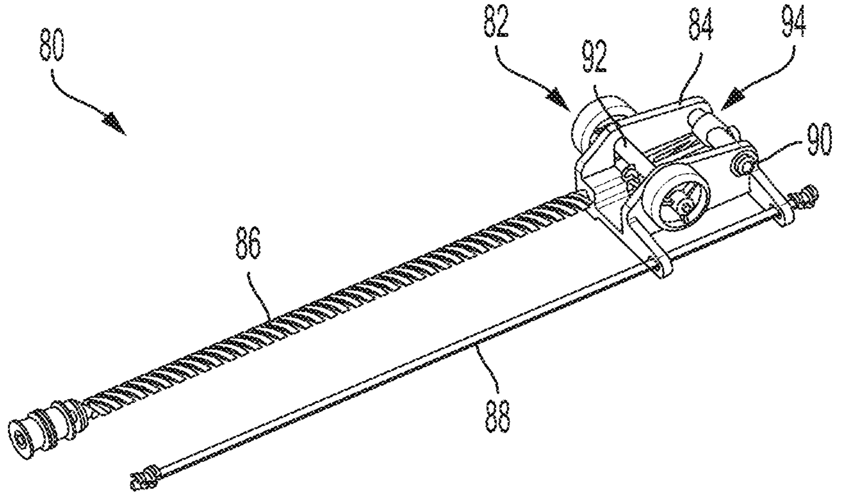
FIG. 8 is a perspective view of a valve adjustment assembly.

FIG. 8 is a perspective view of valve adjustment assembly 80. Valve adjustment assembly 80 comprises fulcrum or pinch element or roller 82 operatively arranged to engage bottom surface 56 to adjust the active length of plate 52. By “active length” it is meant the portion of plate 52 that can be engaged and disengaged with bottom surface 121B via actuator 64. Fulcrum 82 linearly displaceable along bottom surface 56 and set at the inboard edge of the sheet or sheets of the print job, thus disabling all holes 124A of the partition between end 58 and fulcrum 82. In some embodiments, fulcrum 82 is displaceable via bracket or carriage 84 and actuator 86. For example, fulcrum 82 is rotatably connected to carriage 84 via shaft 92. Carriage 84 is linearly displaceable along plate 52 via actuator or screw drive 86. Actuator 86 is threadably engaged with carriage 84 and guide shaft is slidably engaged with carriage. Thus, as actuator 86 is rotated, carriage 84 linearly displaces therealong. In some embodiments, carriage 84 further comprises spring 94 connected to shaft 90. In some embodiments, carriage 84 comprises two fulcrums 82 that engage two plates 52 (i.e., on carriage 84 is capable of adjusting the active length of the valves in one zone or two partitions).

Figure 9A:
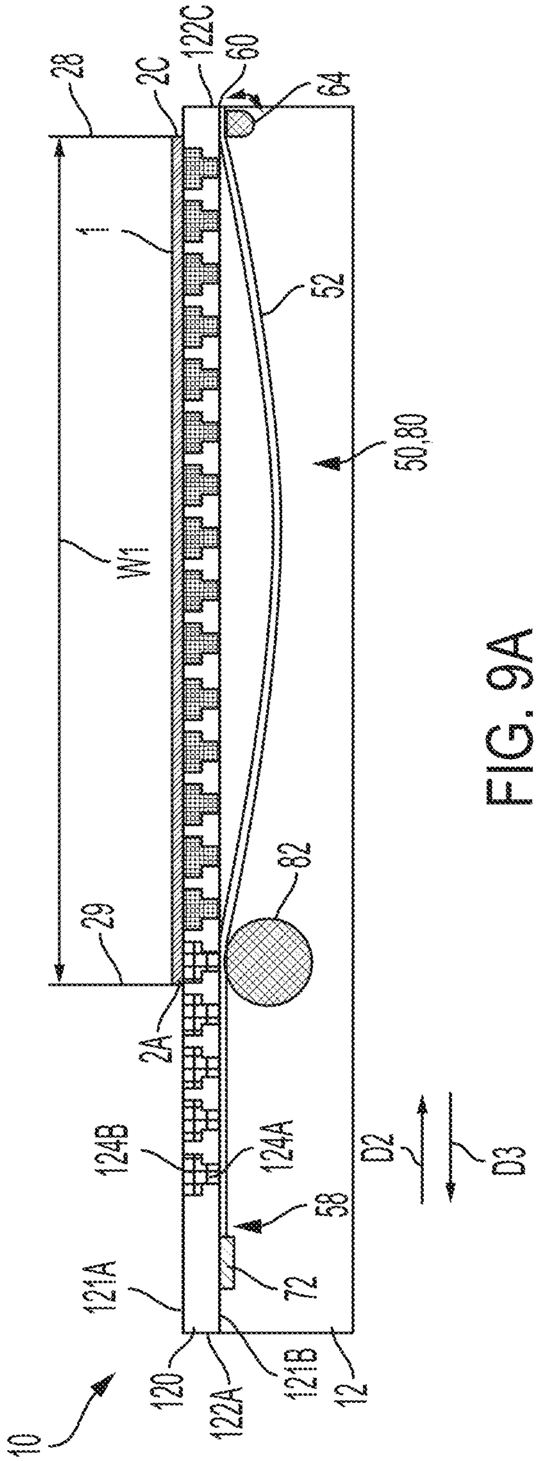
FIG. 9A is a schematic cross-sectional view of the vacuum transport assembly taken generally along line 9-9 in FIG. 5, with the valve in an open position.

FIG. 9A is a schematic cross-sectional view of vacuum transport assembly 10 taken generally along line 9-9 in FIG. 5, with valve 52 in an open position. As shown, fulcrum 82 has been displaced from end 58 in outboard cross process direction D2 to line 29. Line 29 is aligned with inboard edge 2A, and together with registered edge 28, represents width W1 of sheet 1 in the cross process direction. Positioning fulcrum 82 at line 29 effectively closes all holes 124A and their respective channels 124B between end 58 and line 29, disabling that portion of the partition (i.e., plate 52 abuts against bottom surface 121B in that portion of the partition). The portion of the partition between line 29 and registered edge 28, however, is enabled (i.e., plate 52 does not abut against bottom surface 121B in that portion of the partition). Vacuum 12 draws air through the open holes 124A and channels 124B.

Figure 9B:
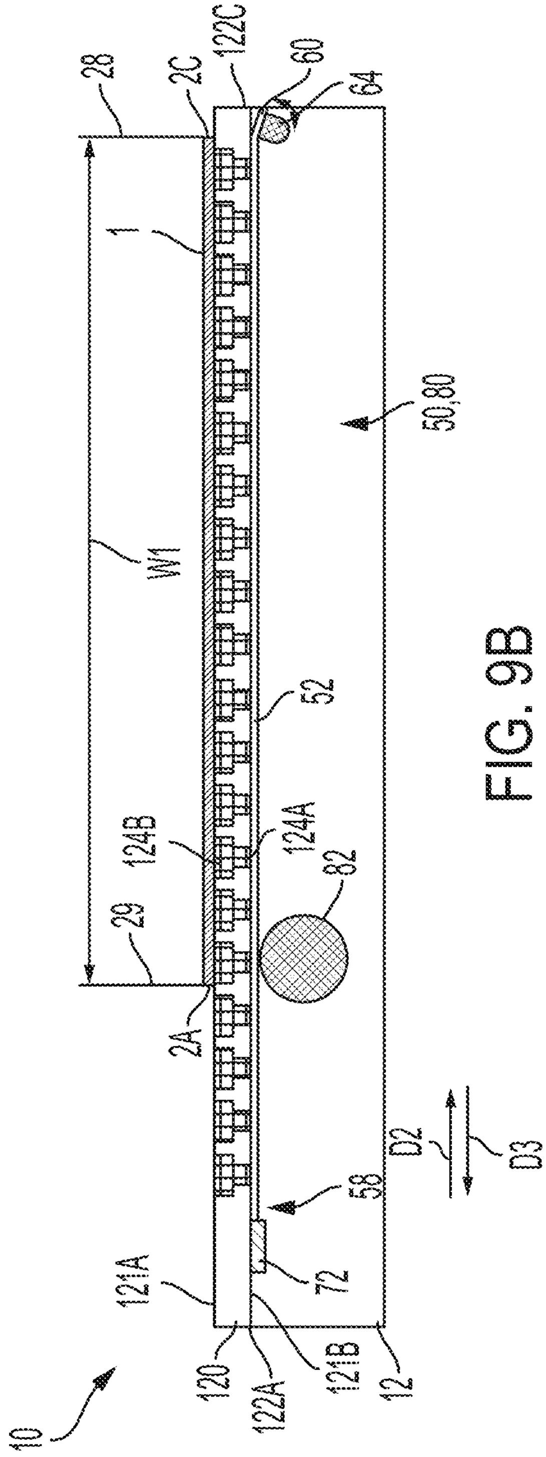
FIG. 9B is a schematic cross-sectional view of the vacuum transport assembly taken generally along line 9-9 in FIG. 5, with the valve in a closed position.

FIG. 9B is a schematic cross-sectional view of vacuum transport assembly 10 taken generally along line 9-9 in FIG. 5, with valve 52 in a closed position. As shown, actuator 64 has rotated end 60 in a first circumferential direction, which in turn displaces plate 52 such that it abuts against bottom surface 121B and blocks holes 124B arranged between line 29 and registered edge 28 (i.e., disables the portion of the partition between line 29 and registered edge 28). Vacuum 12 cannot draw air through any holes 124A or channels 124B.

Figure 10A:
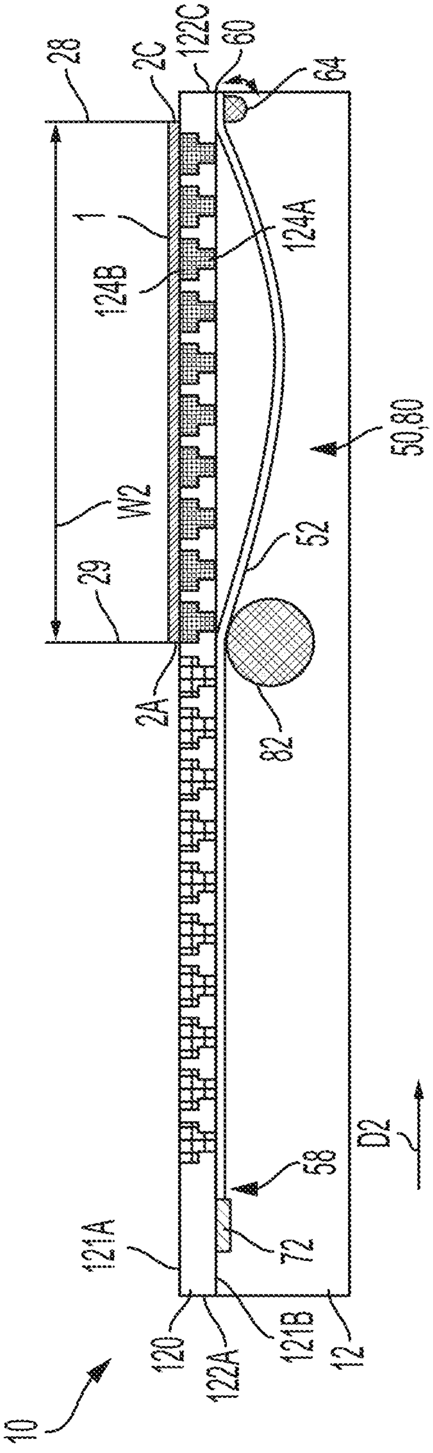
FIG. 10A is a schematic cross-sectional view of the vacuum transport assembly taken generally along line 10-10 in FIG. 5, with the valve in an open position.
Figure 10B:
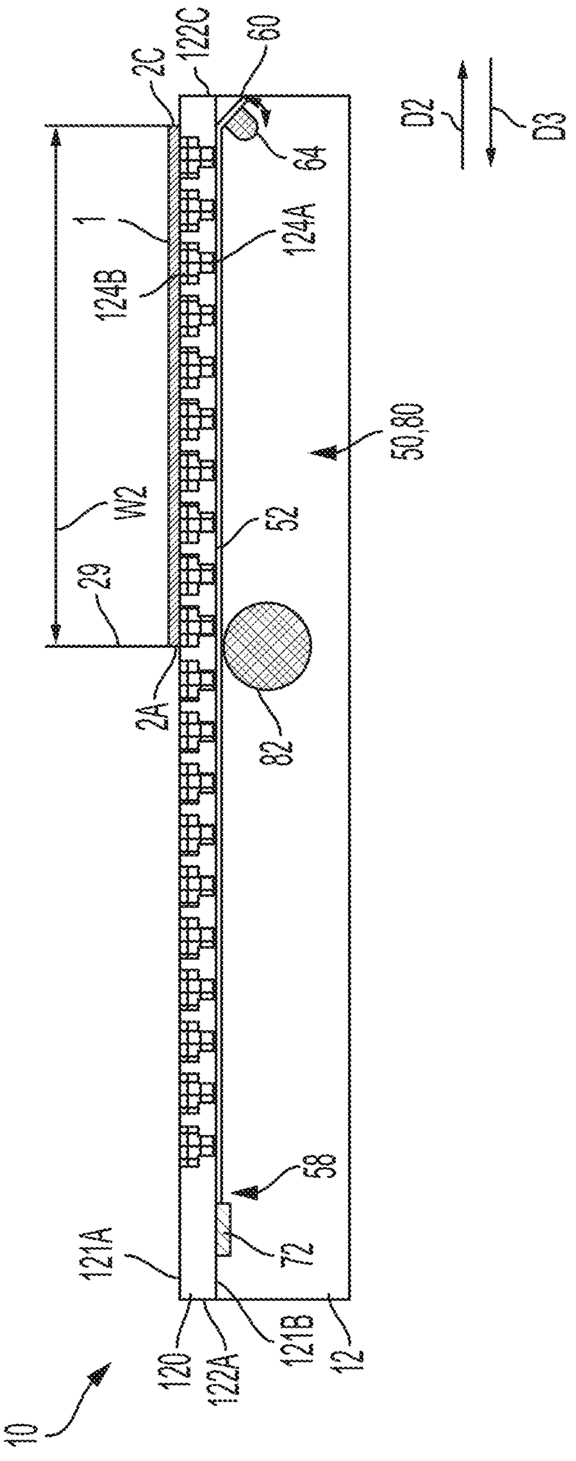
FIG. 10B is a schematic cross-sectional view of the vacuum transport assembly taken generally along line 10-10 in FIG. 5, with the valve in a closed position.

FIG. 10A is a schematic cross-sectional view of vacuum transport assembly 10 taken generally along line 10-10 in FIG. 5, with valve 52 in an open position. Similar to FIG. 9A, fulcrum 82 is displaced to line 29; however, line 29 is arranged closer to registered edge 28 reflective of width W2 of sheet 1, width W2 being less than width W1. Actuator 64 maintains plate 52 in an open position such that, between line 29 and registered edge 28, plate 52 is separated from bottom surface 121B and holes 124A and channels 124B are open. FIG. 10B is a schematic cross-sectional view of vacuum transport assembly 10 taken generally along line 10-10 in FIG. 5, with valve 52 in a closed position. Actuator 64 is rotated end 60 in a first circumferential direction to displace plate 52 into abutment with bottom surface 121B, thus closing holes 124A and channels 124B and disabling the partition. In some embodiments, when plate 52 is in an open position, end 60 abuts against bottom surface 121B, and when plate 52 is in a closes position, end 60 is separated from bottom surface 121B.

Figure 11A:
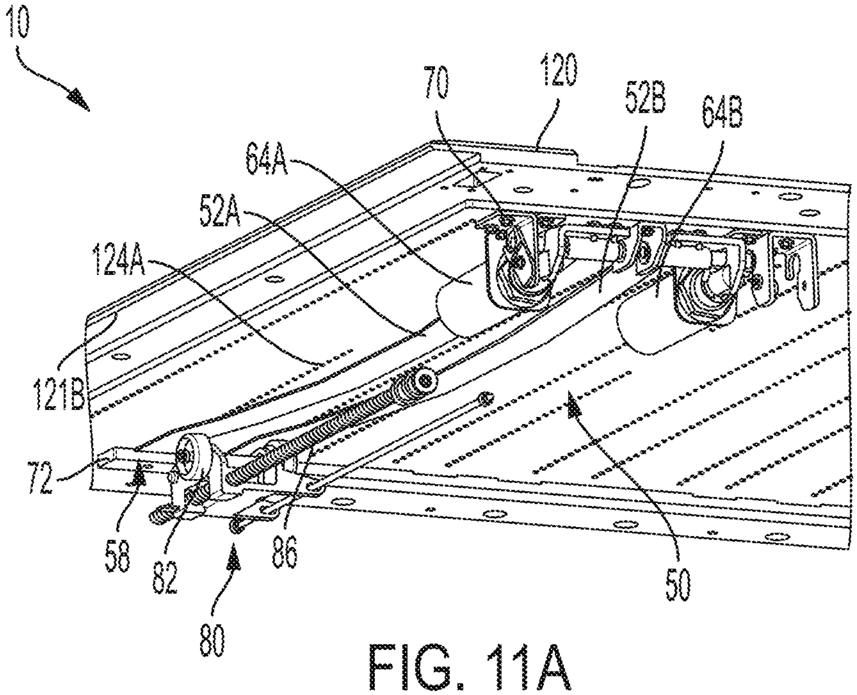
FIGS. 11A-12B are partial bottom perspective views of a vacuum transport assembly showing the valve assemblies and valve adjustment assemblies in various positions.
Figure 11B:
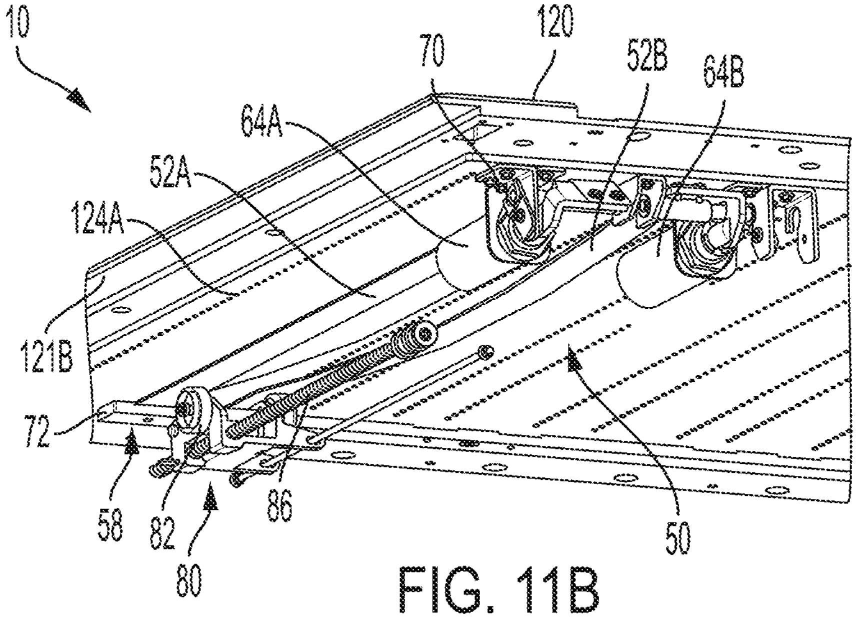
Figure 12A:
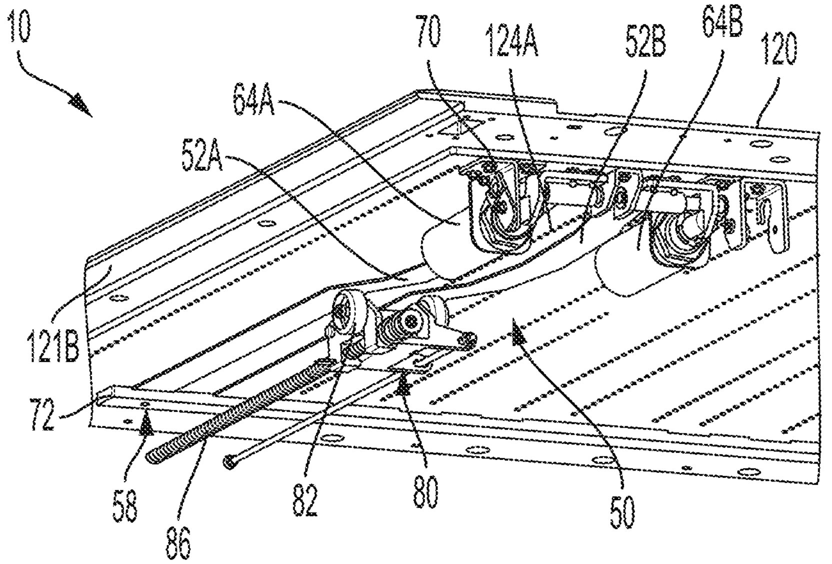
Figure 12B:
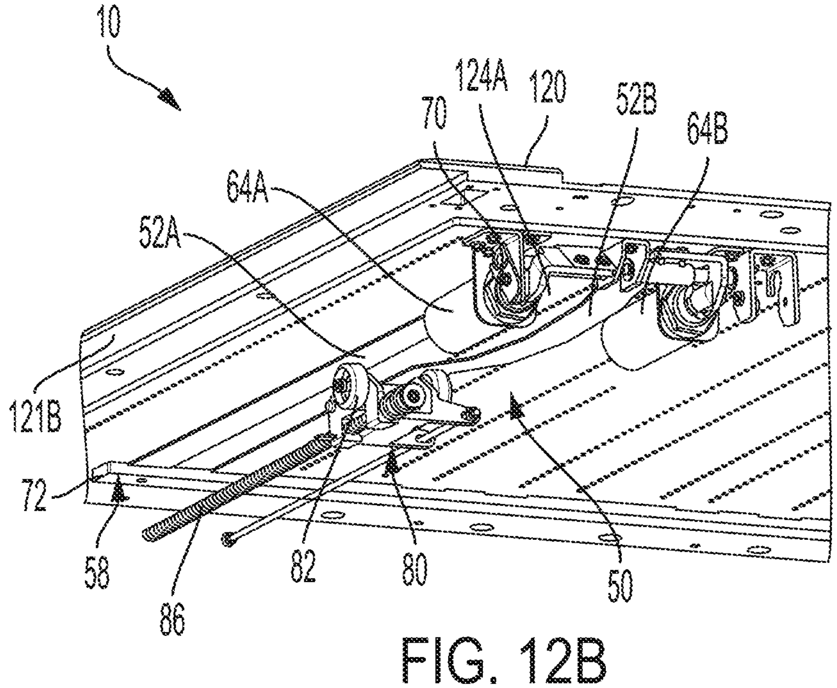

FIGS. 11A-12B are partial bottom perspective views of vacuum transport assembly 10 showing valve assemblies 50 and valve adjustment assemblies 80 in various positions. As shown in FIGS. 11A-B, fulcrums 82 are arranged toward ends 58 of valves 52A-B. In FIGS. 12A-B, fulcrums 82 are displaced in outboard cross process direction D2, thereby shortening the active length of valves 52A-B. In some embodiments, fulcrums 82 are displaced by rotating drive screw 86.

FIG. 11A shows both of valves 52A-B in the open position, and thus holes 124A aligned with valves 52A-B, and their respective channels 124B, are open. In some embodiments, valves 52A-B remain in the open position when actuators 64A-B are not energized (i.e., valves 52A-B are leaf springs biased toward the open position). FIG. 11B shows valve 52A in the closed position and valve 52B in the open position. Actuator 64A is energized thereby rotating bracket 66 and end 60 such that valve 52A abuts against bottom surface 121B and closes holes 124A aligned therewith, and their respective channels. FIG. 12A shows both of valves 52A-B in the open position, and thus holes 124A aligned with valves 52A-B, and their respective channels 124B, are open. FIG. 12B shows valve 52A in the closed position and valve 52B in the open position.

Figure 13:
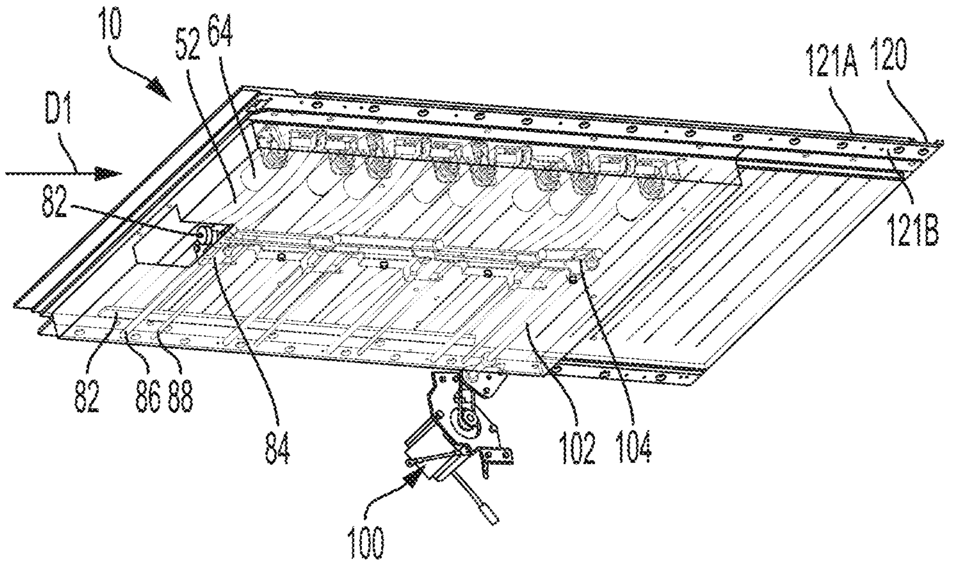
FIG. 13 is a partial bottom perspective view of a vacuum transport assembly.

FIG. 13 is a partial bottom perspective view of vacuum transport assembly 10. As shown, vacuum transport assembly 10 comprises eight valves 52 operatively arranged to enable and disable eight partitions (e.g., partitions 32A-28B). Each of valves 52 comprises a respective actuator 64. Vacuum transport assembly 10 further comprises four valve adjustment assemblies 80, or eight fulcrums 82. Valve adjustment assemblies 80 are controlled by actuator or motor 100. Specifically, drive screws 86 are connected to belt or gear system 104, which is connected to drive shaft 102. Actuator 100, drive shaft 102, belt system 104, and drive screws 86 are non-rotatably connected meaning, as one component rotates, all components rotate. Thus, as actuator 100 rotates drive screws 86 rotate thereby displacing carriages 84 and fulcrums 82 linearly along valves 52. The system shown in FIG. 13 allows the inboard registered edge to be set based on the width of the sheets (i.e., closes all holes 124A inboard of the inboard edge of the sheet).

Figure 14A:
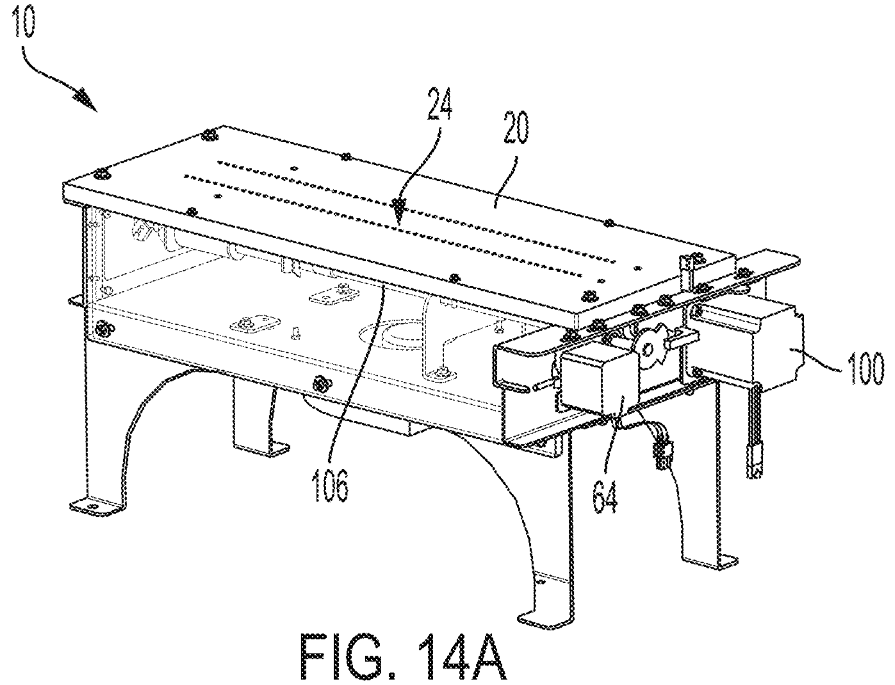
FIG. 14A is a front perspective view of a vacuum transport assembly.
Figure 14B:
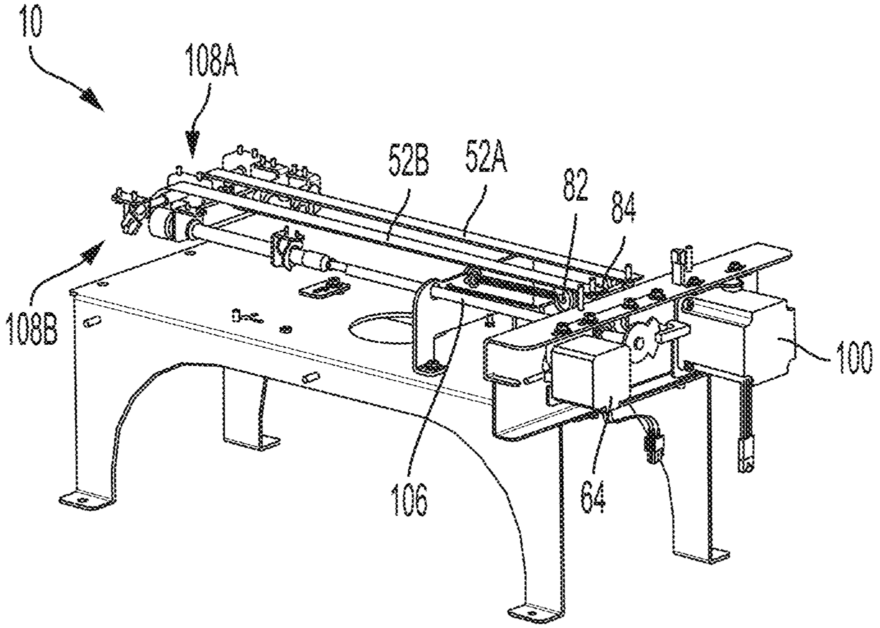
FIG. 14B is a partial front perspective view of the vacuum transport assembly shown in FIG. 14A.

FIG. 14A is a front perspective view of vacuum transport assembly 10. FIG. 14B is a partial front perspective view of vacuum transport assembly 10, with platen 20 including holes 24 removed. FIGS. 15A-D are detailed rear perspective views of vacuum transport assembly 10 with valves 52A-B in various positions. In the embodiment shown in FIGS. 14A-15D, vacuum transport assembly 10 comprises one or more valves (e.g., valves 52A-B), and carriage 84 comprising one or more fulcrums 82 engaged with the valves. Actuator or motor 100 is operatively arranged to displace the valve adjustment assembly, namely, fulcrums 82, along valves 52, as previously described. Vacuum transport assembly 10 further comprises actuator or motor 64 operatively arranged to rotate shaft 106. Shaft 106 is connected to motor 64 at a first end and to cams 108A-B at a second end. Thus, as motor 64 rotates, cams 108A-B rotate. Cams 108A-B engage brackets 66 of valves 52A. For example, each of brackets 66 comprises a wheel rotatably connected thereto. The wheel engages its respective cam 108A, 108B. Cam 108A comprises projection or raised lip 110A and cam 108B comprises projection or raised lip 110B. Raised lips 110A-B engage brackets 66 and rotatably displace them so as to move valves 52A-B between the open position and the closed position, respectively. In some embodiments, springs 112 bias brackets 66 in a first circumferential direction and thus bias valves 52A-B toward a closed position.

When projections 110A-B engage their respective brackets 66, brackets 66 are displaced in a second circumferential direction, opposite the first circumferential direction, thus moving valves 52A-B to the open position. Cams 108A-B and their respective projections 110A-B are arranged such that valves 52A-B can exhibit four states, as described below.

Figure 15A:
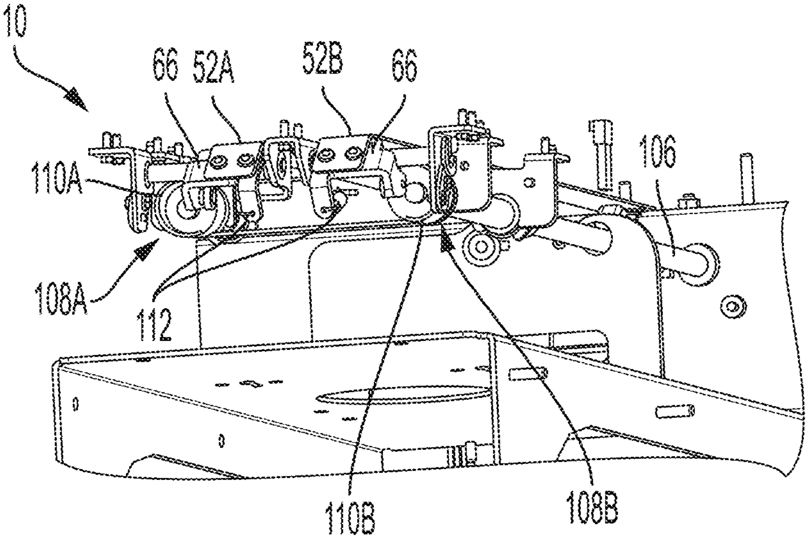
FIGS. 15A-D are detailed rear perspective views of the vacuum transport assembly shown in FIG. 14B, with the valves in various positions.

FIGS. 14B and 15A illustrate a first state of valves 52A-B. In the first state, projection 110A and projection 110B are not engaged with their respective brackets 66 and as such, springs 112 bias brackets 66 and valves 52A-B into the closed position.

Figure 15B:
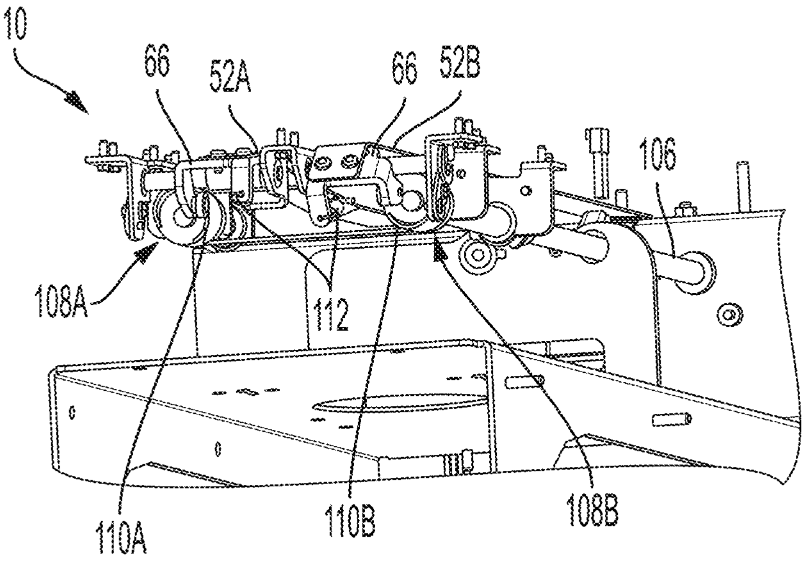

FIG. 15B shows a second state of valves 52A-B. In the second state, projection 110A is engaged with its respective bracket 66 thereby rotating bracket 66 and moving valve 52A to the open position. Projection 110B is not engaged with its respective bracket 66 and as such, spring 112 biases bracket 66 and valve 52B into the closed position.

Figure 15C:
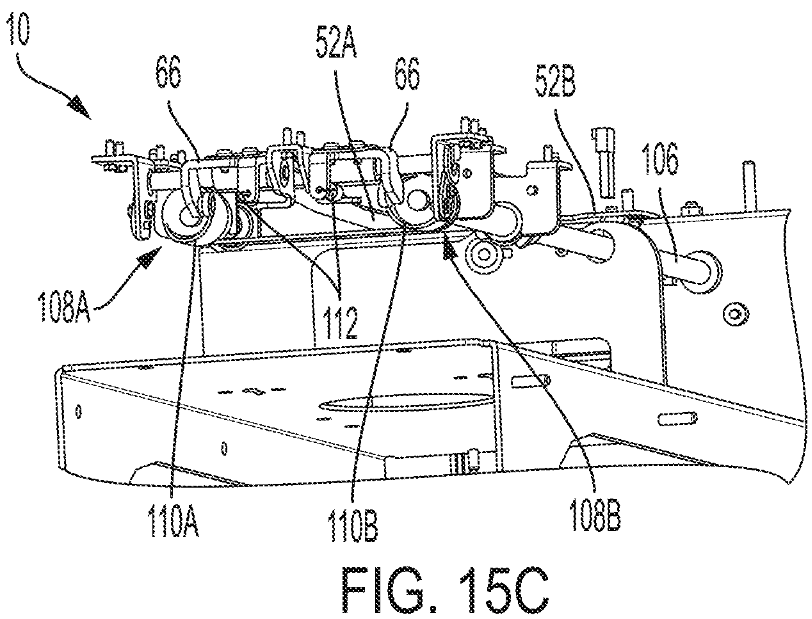

FIG. 15C shows a third state of valves 52A-B. In the third state, projection 110A and projection 110B are engaged with their respective brackets 66 thereby rotating brackets 66 and moving both of valves 52A-B to the open position.

Figure 15D:
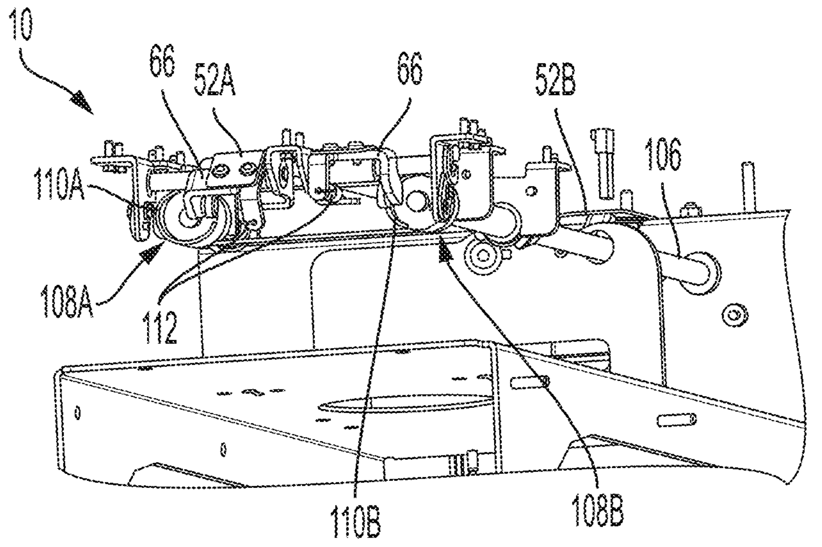

FIG. 15D shows a fourth state of valves 52A-B. In the fourth state, projection 110B is engaged with its respective bracket 66 thereby rotating bracket 66 and moving valve 52B to the open position. Projection 110A is not engaged with its respective bracket 66 and as such, spring 112 biases bracket 66 and valve 52A into the closed position. Thus, by using a camming system as shown, one actuator (e.g., motor 64) can be used to control a plurality of valves (e.g., valves 52A-B), which may be desirable instead of using one actuator for every valve.

Figure 16:
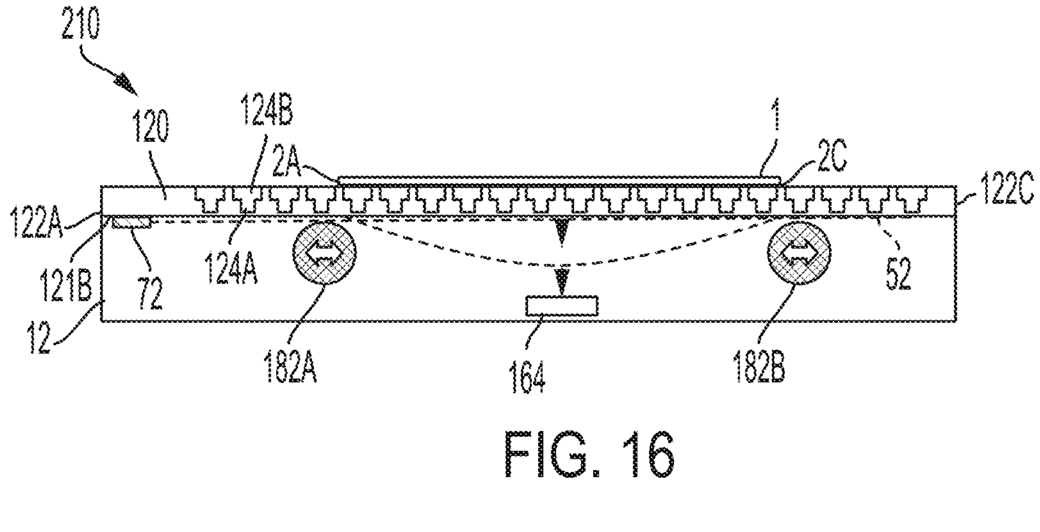
FIG. 16 is a schematic view of a vacuum transport assembly.

FIG. 16 is a schematic view of vacuum transport assembly 210. Similar to vacuum transport assembly 10, vacuum transport assembly 210 comprises platen 120 comprising top surface 121A, bottom surface 121B, inboard side 122A, outboard side 122C, holes 124A, channels 124B, vacuum 12, and valve 52 engageable with bottom surface. Vacuum transport assembly 210 further comprises fulcrums 182A-B engaged with and displaceable along valve 52. This arrangement is desirable for non-registered printing systems when all edges (i.e., lead, trail, inboard, and outboard) are exposed to vacuum. Thus, fulcrum 182A is displaced along valve 52 in a cross process direction and aligned with inboard edge 2A of sheet 1. This closes holes 124A and channels 124B between inboard side 122A and inboard edge 2A. Fulcrum 182B is displaced along valve 52 in a cross process direction and aligned with outboard edge 2C of sheet 1. This closes holes 124A and channels 124B between outboard side 122C and outboard edge 2C. Vacuum transport assembly 210 further comprises actuator 164 operatively arranged to move the enable and disable the portion of the partition between fulcrums 182A and 182B (i.e., to close holes 124A and channels 124B between fulcrums 182A-B).

It should be appreciated that the method and assemblies disclosed herein can be controlled by a controller or computing device. For example, a controller may communicate with one or more sensors that detect sheets entering and passing through vacuum transport assembly 10. Based on detection of the size and location of the sheet, via the one or more sensors, the controller adjusts the active length of valves 52 via valve adjustment assemblies 80, and opens and closes valves 52 via actuators to enable and disable specific partitions, respectively. As such, the controller can be programmed with software or program instructions to carry out the method disclosed herein. In some embodiments, controller receives information related to a print job, for example, sheet size, total number of sheets, distance between each sheet when moving in the process direction D1, etc. Based on this information, controller adjusts the active length of valves 52 via valve adjustment assemblies 80 and opens and closes valves 52 based on a precalculated location of the sheets (i.e., based on the time the first sheet is to enter platen 20 and the separation between each sheet).

Figure 17:
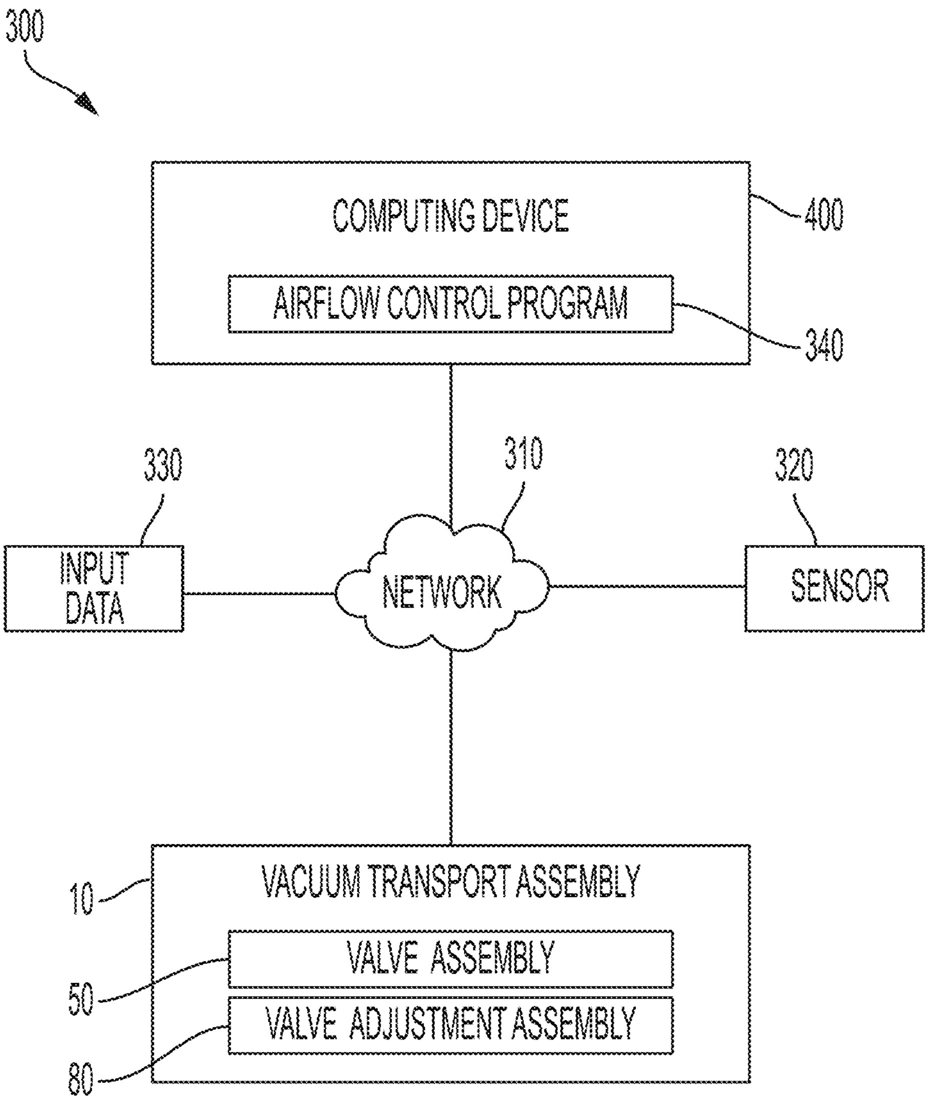
FIG. 17 is a functional block diagram illustrating an environment, in accordance with some embodiments of the present disclosure.

FIG. 17 is a functional block diagram illustrating a sheet edge airflow control environment, generally environment 300, in accordance with some embodiments of the present disclosure. FIG. 17 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, environment 300 includes one or more of the following connected to network 310: computing device 400, sensor 320, input data 330, and vacuum transport assembly 10. In some embodiments, environment 300 further comprises valve assembly 50 and/or valve adjustment assembly 80, which may be included on or as a separate component from vacuum transport assembly 10. In some embodiments, environment 300 may further comprise or communicate with a print server or central controller, which communicates with vacuum transport assembly 10 and/or computing device 400 regarding print jobs.

Network 310 can be, for example, a local area network (LAN), a wide area network (WAN) such as the Internet, or a combination of the two, and can include wired, wireless, or fiber optic connections.

Computing device 400 may be a hardware device that controls airflow along the edges of sheets passing over or through vacuum transport assembly 10 using airflow control program 340. Computing device 400 is capable of communicating with network 310, sensor 320, input data 330, and vacuum transport assembly 10, and in some embodiments, a print server. In some embodiments, computing device 400 may include a computer. In some embodiments, computing device 400 may include internal and external hardware components, as depicted and described in further detail with respect to FIG. 19. In some embodiments, airflow control program 340 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 19.

Airflow control program 340 is primarily installed on computing device 400, although it may additionally or alternatively be installed on vacuum transport assembly 10. Airflow control program 340 is operatively arranged to, based on a size and position of a sheet on vacuum transport assembly 10, enable and disable airflow about the edges of the sheet, as previously described. In some embodiments, airflow control program 340 receives sheet size and or position from sensor 320. In some embodiments, airflow control program 340 receives information related to the print job, for example from input data 330 or a print server. This information may include how many sheets are to be printed, the sheet size, the spacing between each sheet on the belt, and other data. Airflow control program 340 uses this information to calculate what holes the sheet edges will encounter and at what time, and disable and enable those holes at specific times such that airflow is disabled along the sheet edges.

Sensor 320 is operatively arranged to detect a position of the sheets within vacuum transport assembly as well as outside of vacuum transport assembly 10, for example, just prior to entering vacuum transport assembly 10. In some embodiments, sensor 320 is also arranged to detect the size of the sheet. Sensor 320 may include any sensor suitable to perform these functions, for example, proximity sensors, optical sensors, position sensors, etc.

Input data 330 is data inputted by a user or from a print job, for example, an input that includes the number and size of sheets in a print job, the spacing between sheets on the belt, and the speed of the sheets traveling through vacuum transport assembly 10. Airflow control program 340 can use this information to determine what holes the sheet edges will align with and when in order to disable and enable such holes.

Figure 18:
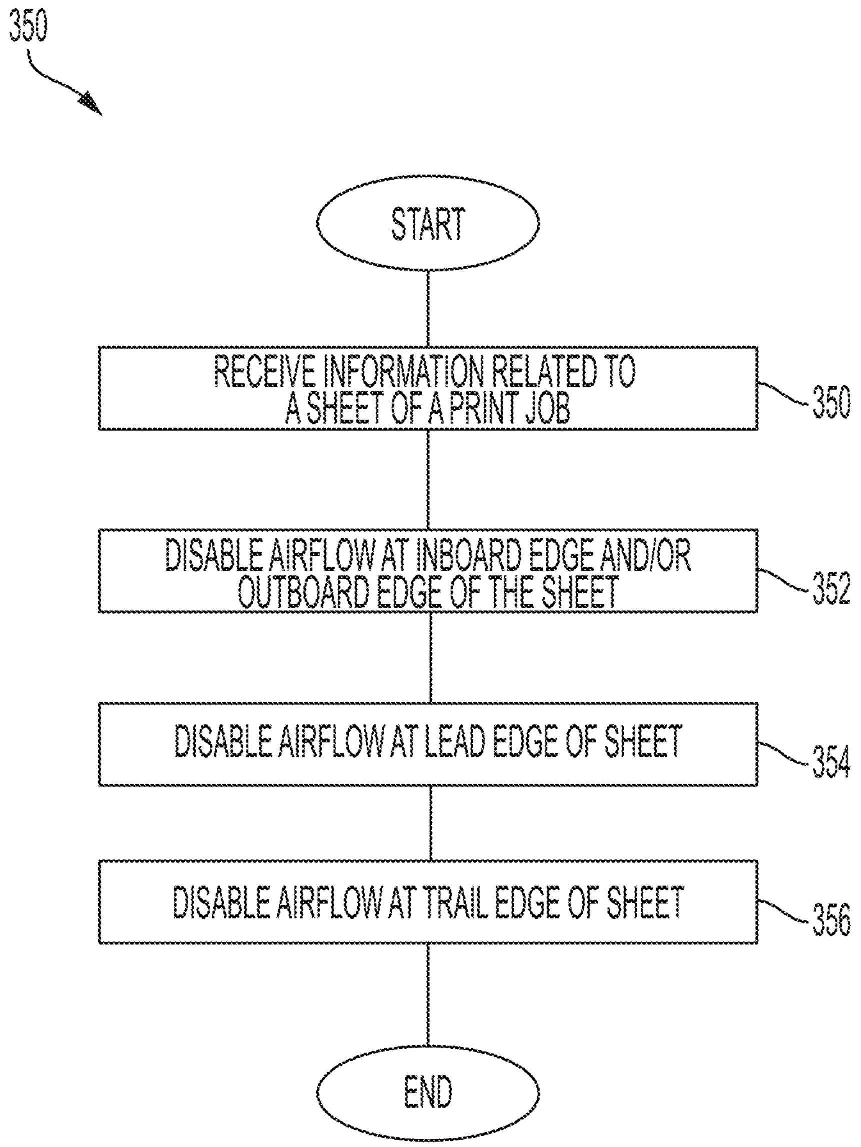
FIG. 18 is a flow chart depicting operational steps for controlling airflow along sheet edges.

FIG. 18 shows flow chart 350 depicting operational steps for controlling airflow along sheet edges, for example, while being transported under print heads in a printing system.

In step 352, airflow control program 340 receives information related to a sheet of a print job. This information can include sheet size and position, the number of sheets in a print job, spacing between sheets traveling on the belt, and speed of the sheets traveling on the belt, In step 354, airflow control program 340 disables airflow at inboard edge 2A of sheet 1. As previously described, in some embodiments, valve adjustment assemblies 80 are displaced along valve assemblies 50 to line 29, which aligns with inboard edge 2A. This effectively closes all holes inboard of inboard edge 2A. In some embodiments, in step 354, airflow control program 340 alternatively or additionally disables airflow at outboard edge 2C (i.e., in non-registered printing systems).

In step 356, airflow control program 340 disables airflow at lead edge 2B of sheet 1. As previously described, just prior to lead edge 2B aligning with one or more holes, for example a partition or portion of holes, airflow control program 340 disables that partition to stop airflow through such holes. In some embodiments, the partition of holes is disabled by displacing valve assembly 50 into engagement with bottom surface 121B of platen 120. This partition of holes remains disabled when lead edge 2B is aligned therewith. After lead edge 2B surpasses the partition of holes, airflow control program 340 enables airflow through that partition of holes by releasing valve assembly 50 from engagement with platen 20, 120.

In step 358, airflow control program 340 disables airflow at trail edge 2D of sheet 1. As previously described, just prior to trail edge 2D aligning with one or more holes, for example a partition or portion of holes, airflow control program 340 disables that partition to stop airflow through such holes. In some embodiments, the partition of holes is disabled by displacing valve assembly 50 into engagement with bottom surface 121B of platen 120. This partition of holes remains disabled when trail edge 2D is aligned therewith. After trail edge 2D surpasses the partition of holes, airflow control program 340 enables airflow through that partition of holes by releasing valve assembly 50 from engagement with platen 20, 120.

Figure 19:
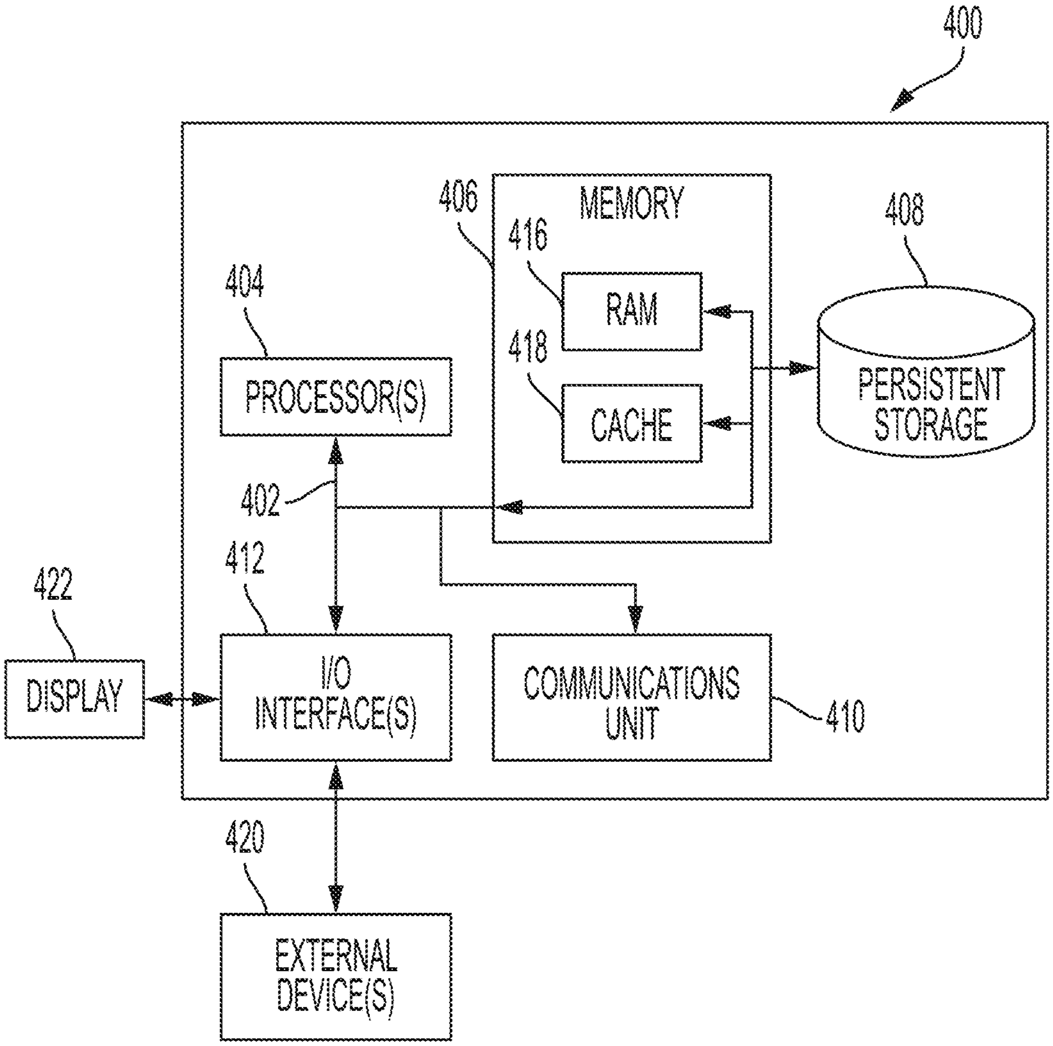
FIG. 19 is a block diagram of internal and external components of a computer system, in accordance with some embodiments of the present disclosure.

FIG. 19 is a block diagram of internal and external components of computer system 400, which is representative of the computing device of FIG. 17, in accordance with some embodiments of the present disclosure. It should be appreciated that FIG. 19 provides only an illustration of one implementation and does not imply any limitations with regard to the environments in which different embodiments may be implemented. In general, the components illustrated in FIG. 19 are representative of any electronic device capable of executing machine-readable program instructions. Examples of computer systems, environments, and/or configurations that may be represented by the components illustrated in FIG. 17 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure. Added, the computer program product may at least one or more of account for the magnetic field of added magnet members designed to assist controlling valves and control the magnetic field of the added magnet members.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 20:
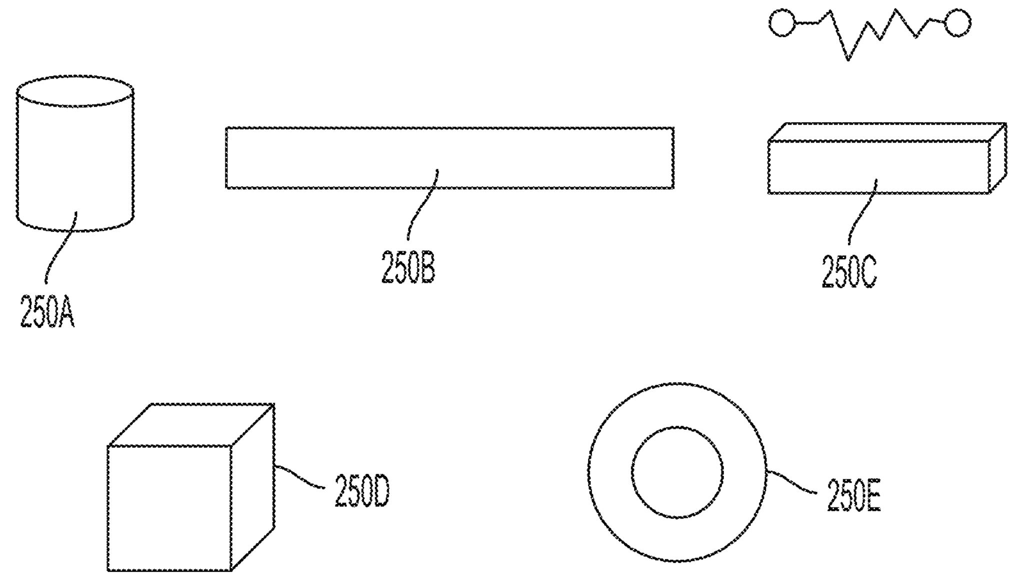
FIG. 20 illustrates magnet member types.
Figure 21:
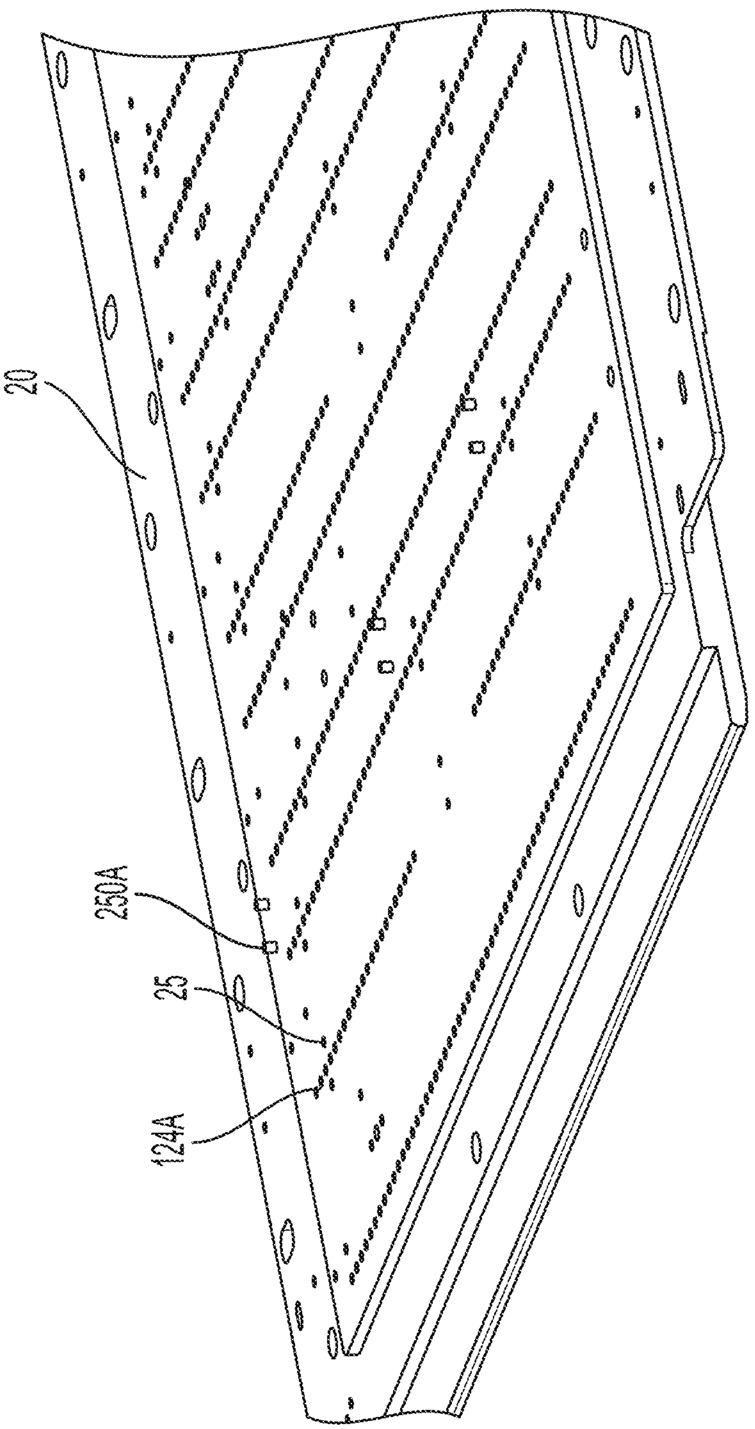
FIG. 21 is a partial top view of the platen.
Figure 22:
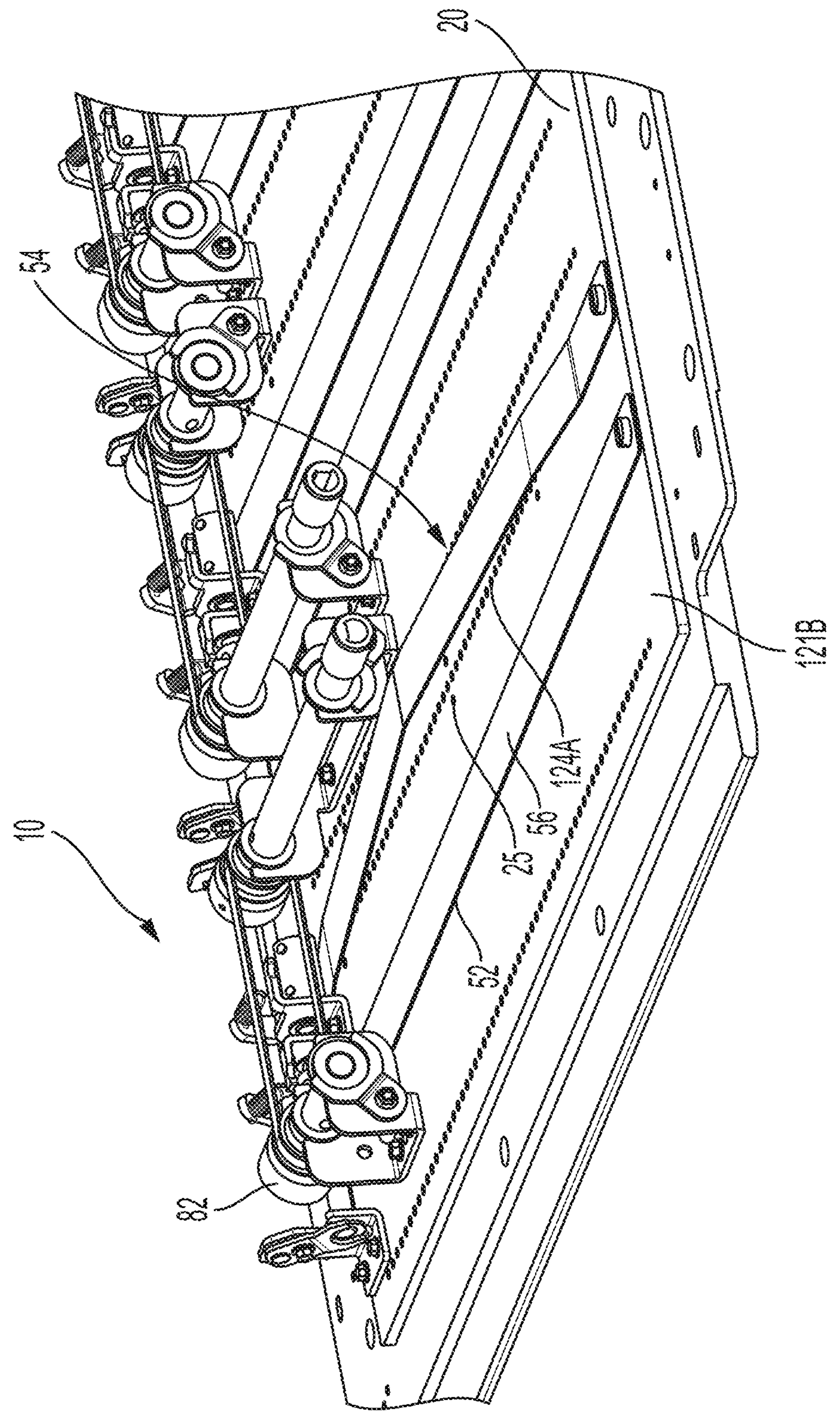
FIG. 22 is a partial bottom view of the vacuum transport assembly.
Figure 23:
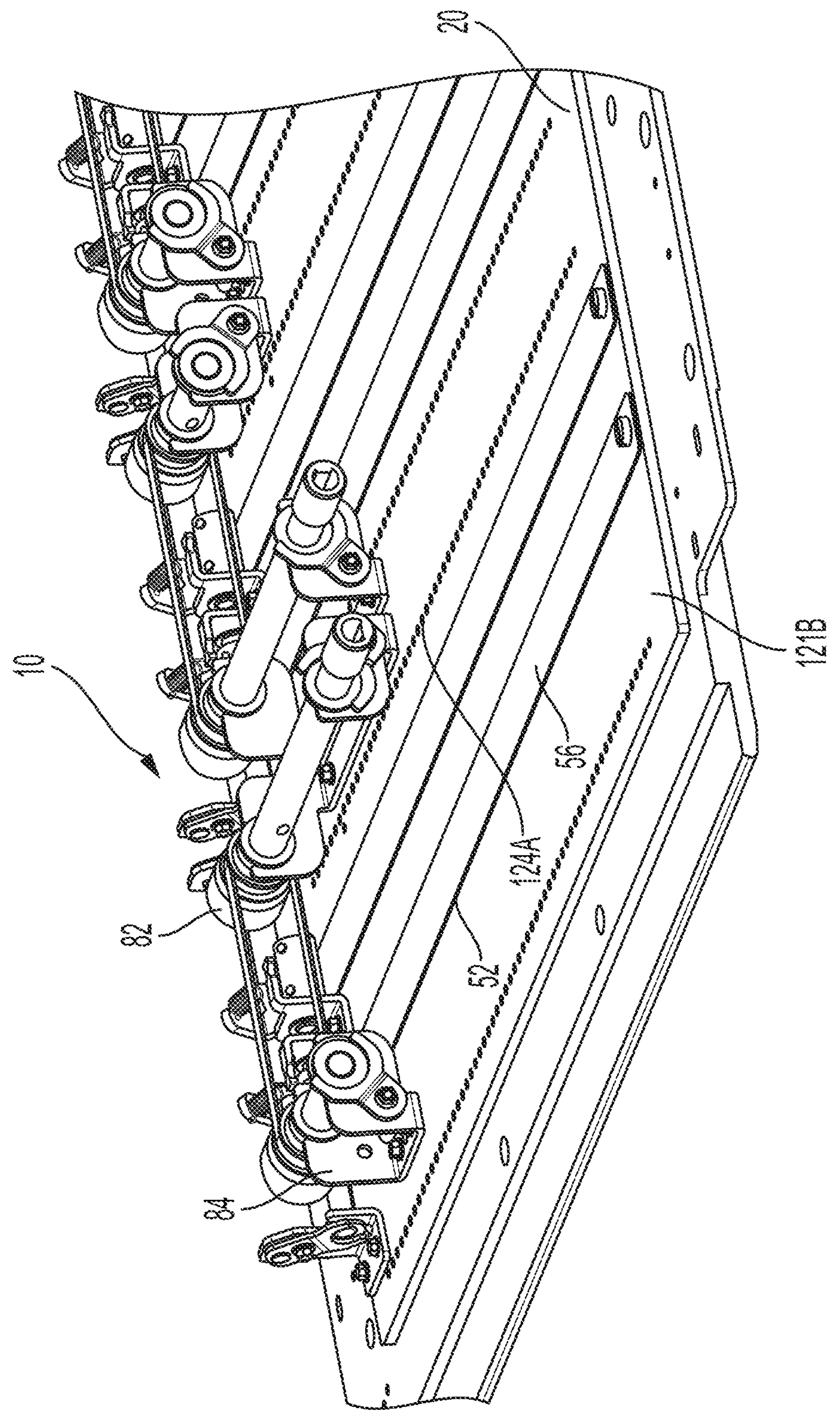
FIG. 23 is a second partial bottom view of the vacuum transport assembly shown in FIG. 22.
Figure 24:
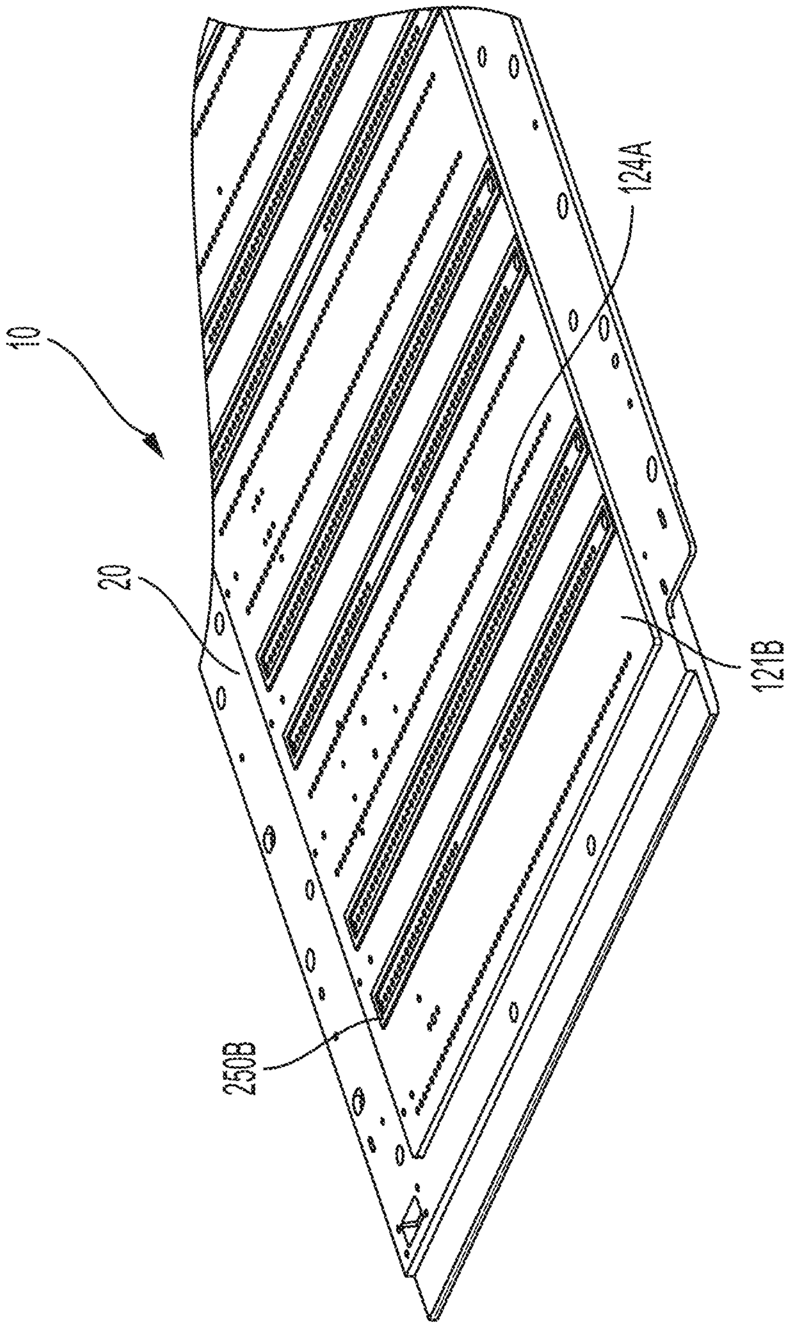
FIG. 24 is a partial bottom view of the platen assembly with magnetic strips, in accordance with some embodiments of the present disclosure.
Figure 25:
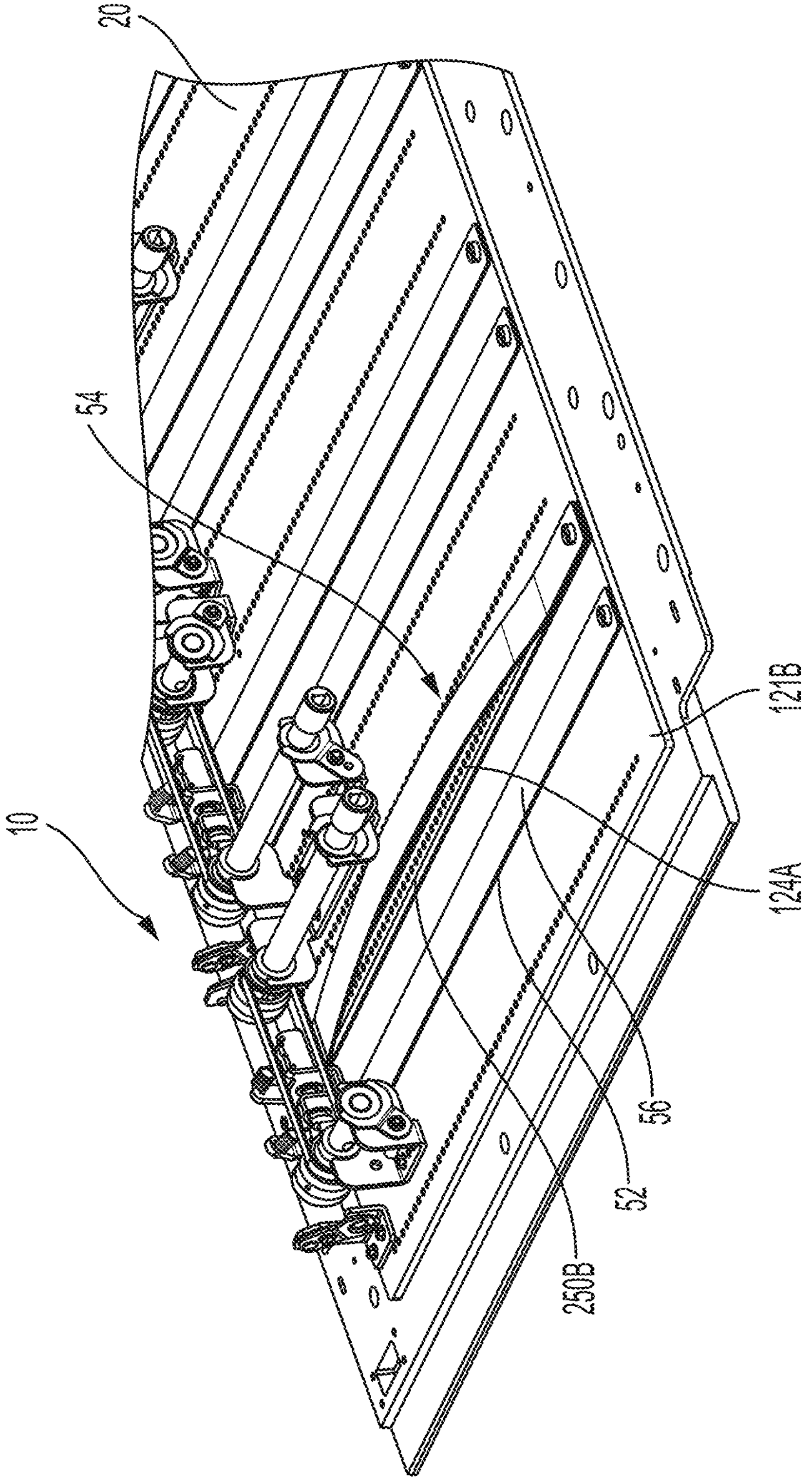
FIG. 25 is a third partial bottom view of the vacuum transport assembly shown in FIG. 22.
Figure 26:
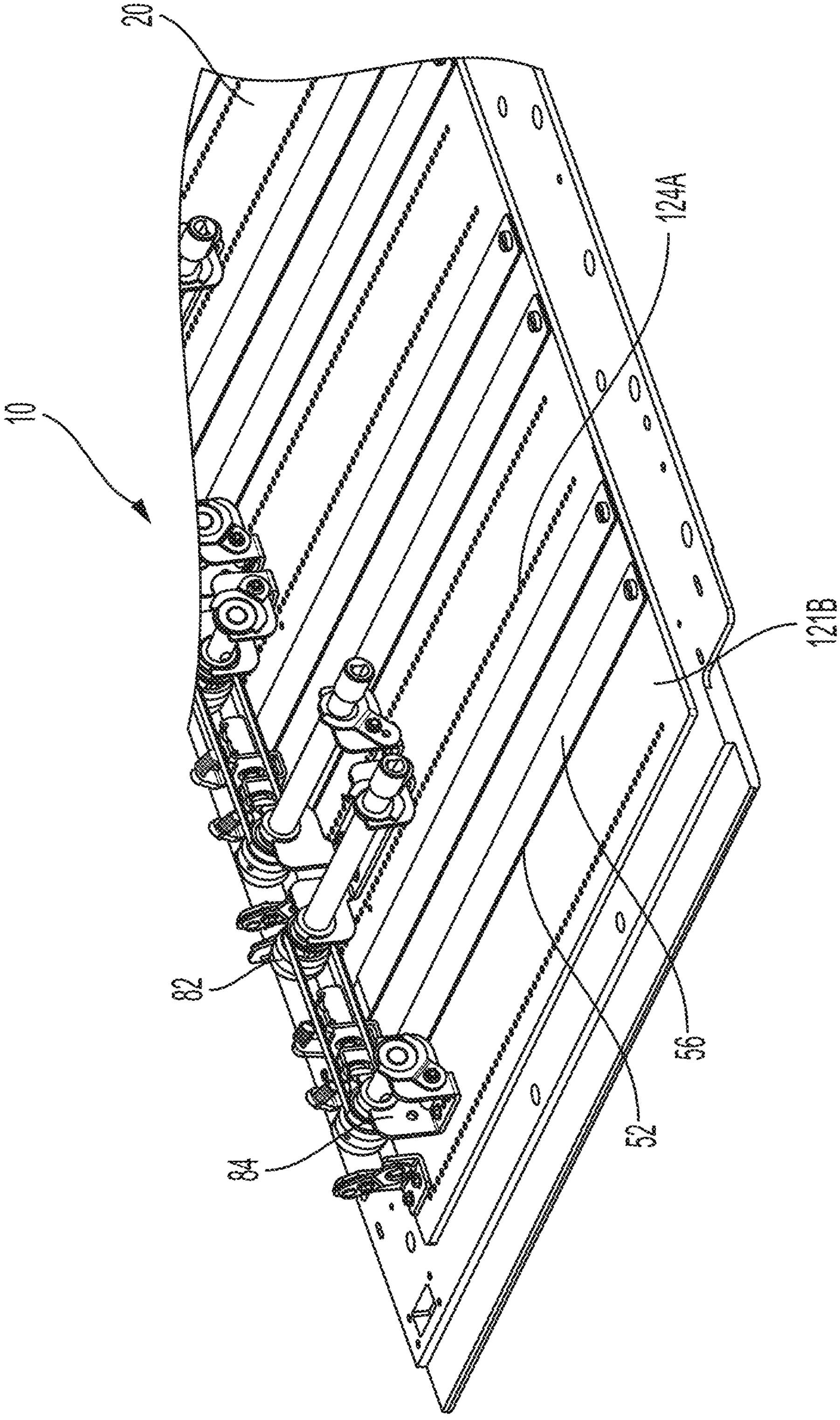
FIG. 26 is a fourth partial bottom view of the vacuum transport assembly shown in FIG. 22.

Added is a representative vacuum transport assembly that uses, as illustrated in FIG. 20, magnet members 250A-250E to aid in controlling valve assembly where 250A is a plug magnet, 250B is a strip magnet, 250C is an electromagnet, 250D is a magnet in the form of a cube, and 250E is a donut magnet. Other magnet shapes and electrified components of the inventive concept may be used. Magnets 250A-250E are used considering equations known in the art and appropriate to the magnets used such as, but not limited to $\mu_0\vec{M}=\vec{B}$ and $\vec{F}=q\vec{v}*\vec{B}$, where B is the magnetic field vector.

FIGS. 21-26 illustrate that the additional embodiments include the platen 20, including the first top surface 121A; the first bottom surface 121B; and the one or more through-holes 124A. Representative additional embodiments include the valve assembly 50 including the plate 52 aligned with the one or more through-holes 124A, the through-holes 124A parallelly arrayed in rows. The additional embodiments include the plate 52 including the second top surface 54; the second bottom surface 56; the first end 58 fixedly secured to the first bottom surface 121B; and the second end 60; and, the first second end 64 connected to the second end 60, but including at least two or more magnet members 250A-250E arrayed longitudinally on each side of given rows. The magnets 250A-250E are designed to assist closing the through-holes 124A with the leaf valve assemblies 52 when the leaf valve assemblies 52 are engaged in a closed state.

The added embodiments may further include the carriage 84 translatably connected to the second actuator 84 and the fulcrum 82 connected to the carriage 84. The added embodiments may further include the fulcrum 82 being a roller. The added embodiments may further include the second actuator 84 being a screw drive. The added embodiments may further include the flexible plate 52 being the leaf spring 52. The added embodiments may further include the first second end 64 being operatively arranged to displace the plate 52 relative to the first bottom surface 121B.

The added embodiments may further include, in a closed state of the valve assembly 50, the second top surface 54 designed to engage with the first bottom surface 121B to close the one or more holes 124A; and in an open state of the valve assembly 50, the second top surface 54 designed to disengage from the first bottom surface 121B such that the one or more holes 124A are open. In this added embodiment, the at least two or more magnet members 250A-250E are designed to engage with the top surface 54 of the valve assembly 50 to draw the valve assembly 50 toward the first bottom surface 121B to close the one or more holes 124A.

Figure 27:
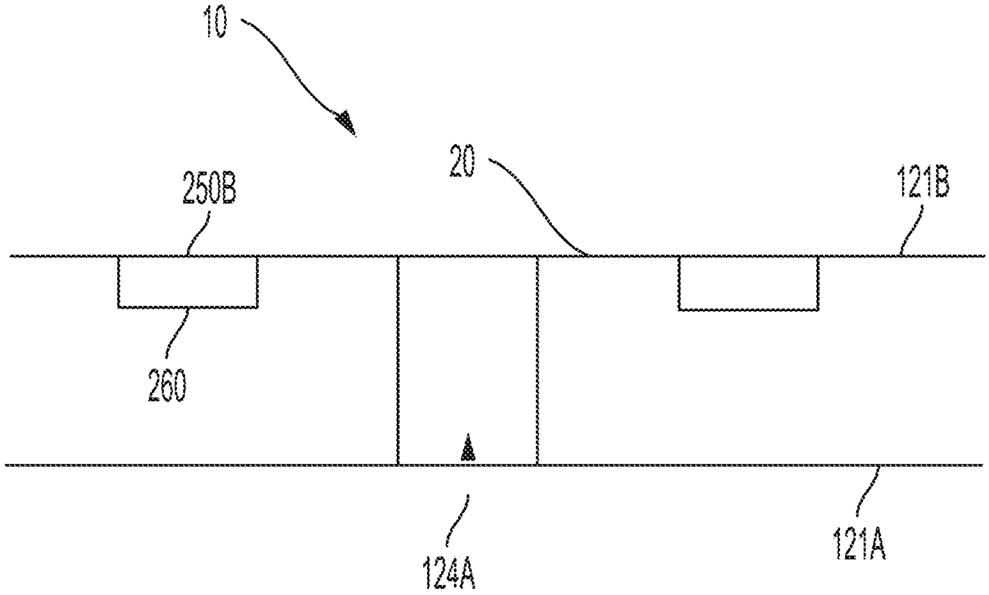
FIG. 27 is a cutaway view of the platen, in accordance with some embodiments of the present disclosure; and, FIG. 28A-28C is a representative method of using the vacuum transport assembly.

The added embodiment can be designed with many types of magnet members 250A-250E, represented by but not limited to, magnetic plug members 250A, the magnet plug members 250A which may further be disposed within magnet hole members 25 to keep the magnet plug members 250A substantially flush to the first bottom surface 121B; magnetic strip members 250B, the magnetic strip members 250B which may, as illustrated in FIG. 27, further be deployed in slot members 260 to the magnetic strip members 250B substantially flush to the first bottom member, and magnet members designed as electromagnet members 250C in the aforementioned or different dispositions. The electromagnet members 250C may further be able to at least one or more of change strength and polarity, may further be designed with wire coils, and are operationally coupled to electrical power source operating the printing system.

The added embodiments may further include, the valve adjustment assembly 80, including: the fulcrum 82 engaged with the second bottom surface 56; and the second actuator 84 operatively arranged to displace the fulcrum 82 with respect to the plate 52.

The added embodiments may further include: the fulcrum 82 forces the plate 52 into contact with the platen 20 at a position along the plate 52 such that: the first portion of the plate 52 extending from the first end 58 to the position abuts against the first bottom surface 121B; and the second portion of the plate 52 extending from the position to the second end 60 is displaceable with respect to the first bottom surface 121B. The added embodiments may further include the first second end 64 connected to the second end 60 via the cam 108A, 109B. Other embodiments previously disclosed may be included as a part of the added embodiments.

Figure 28A:
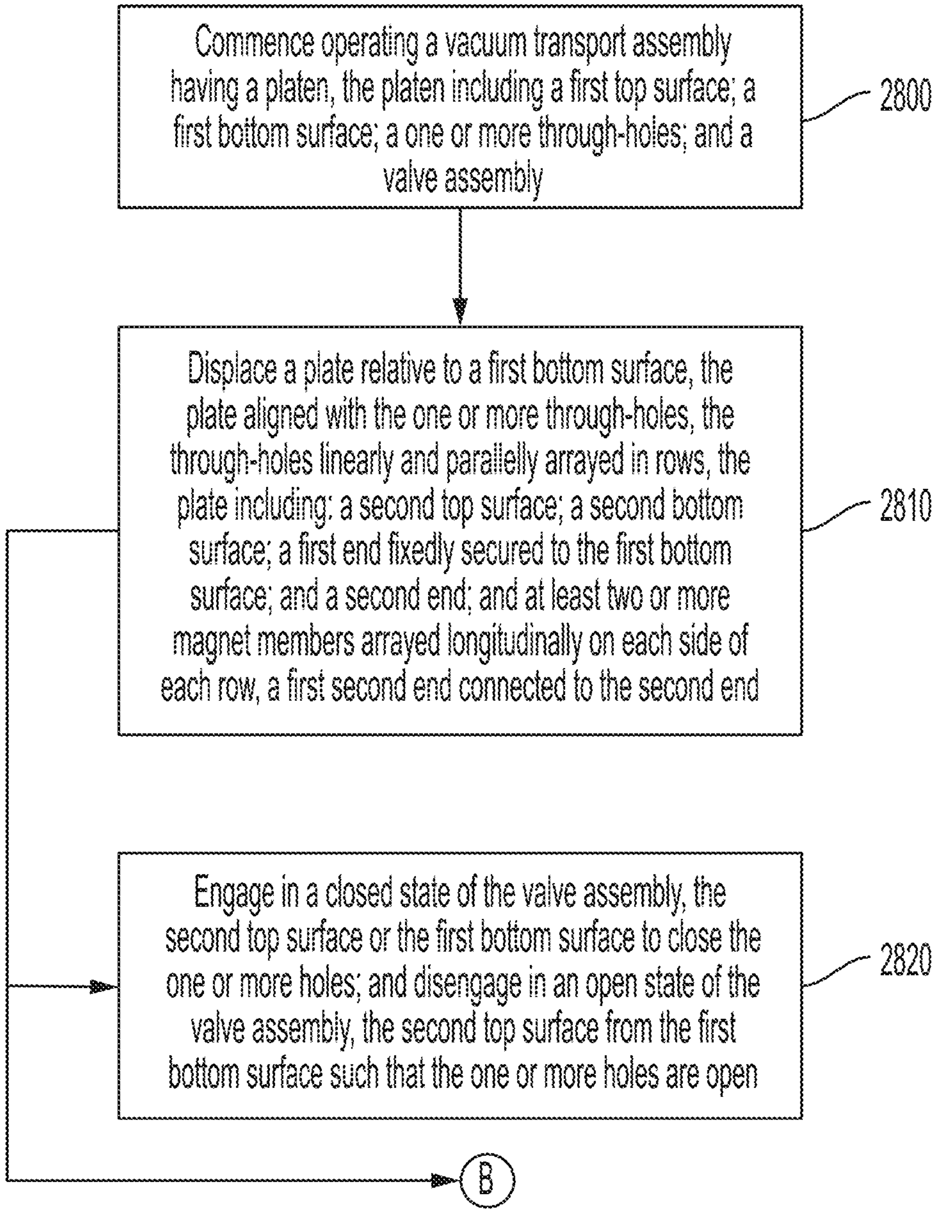
Figure 28B:
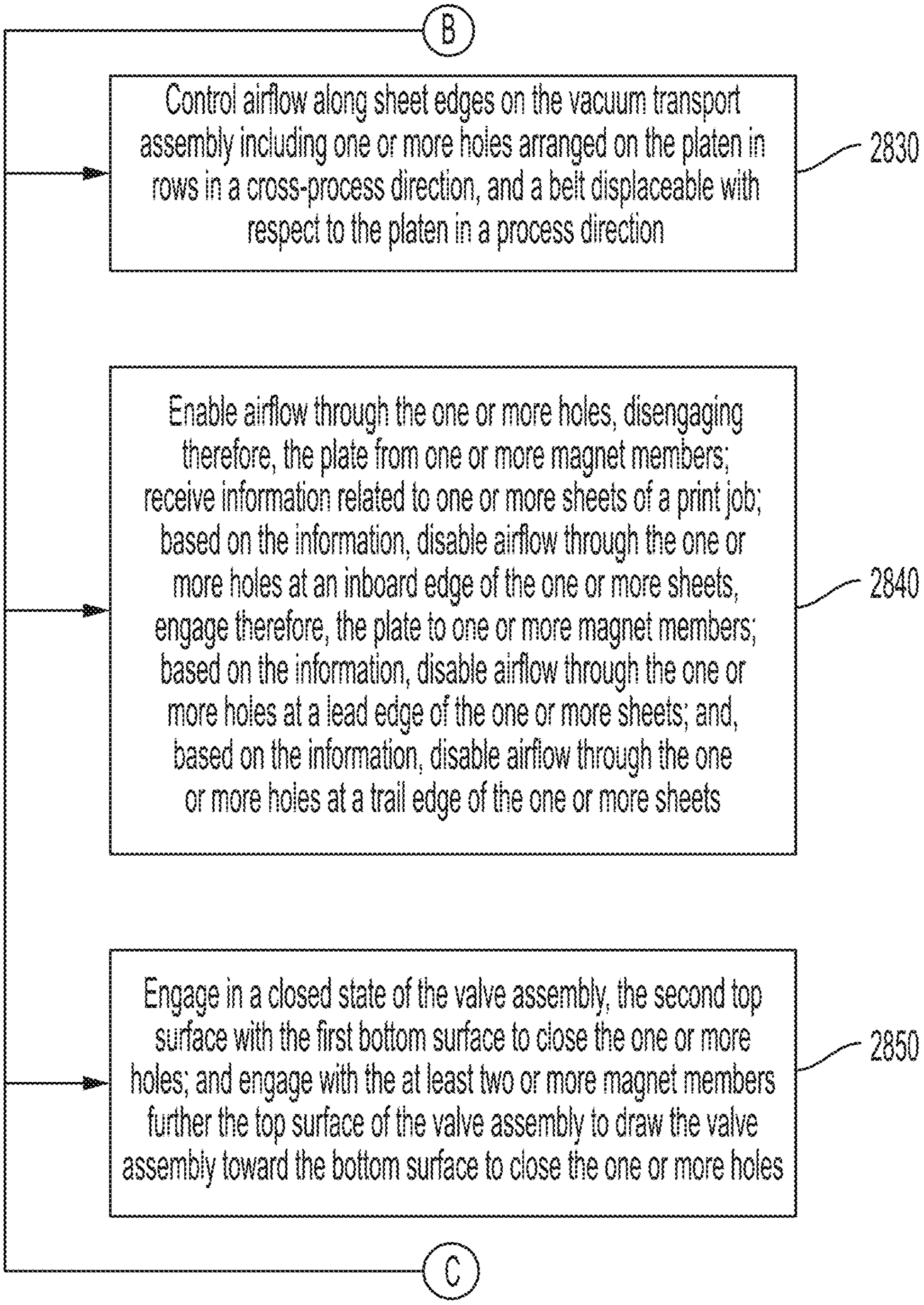
Figure 28C:
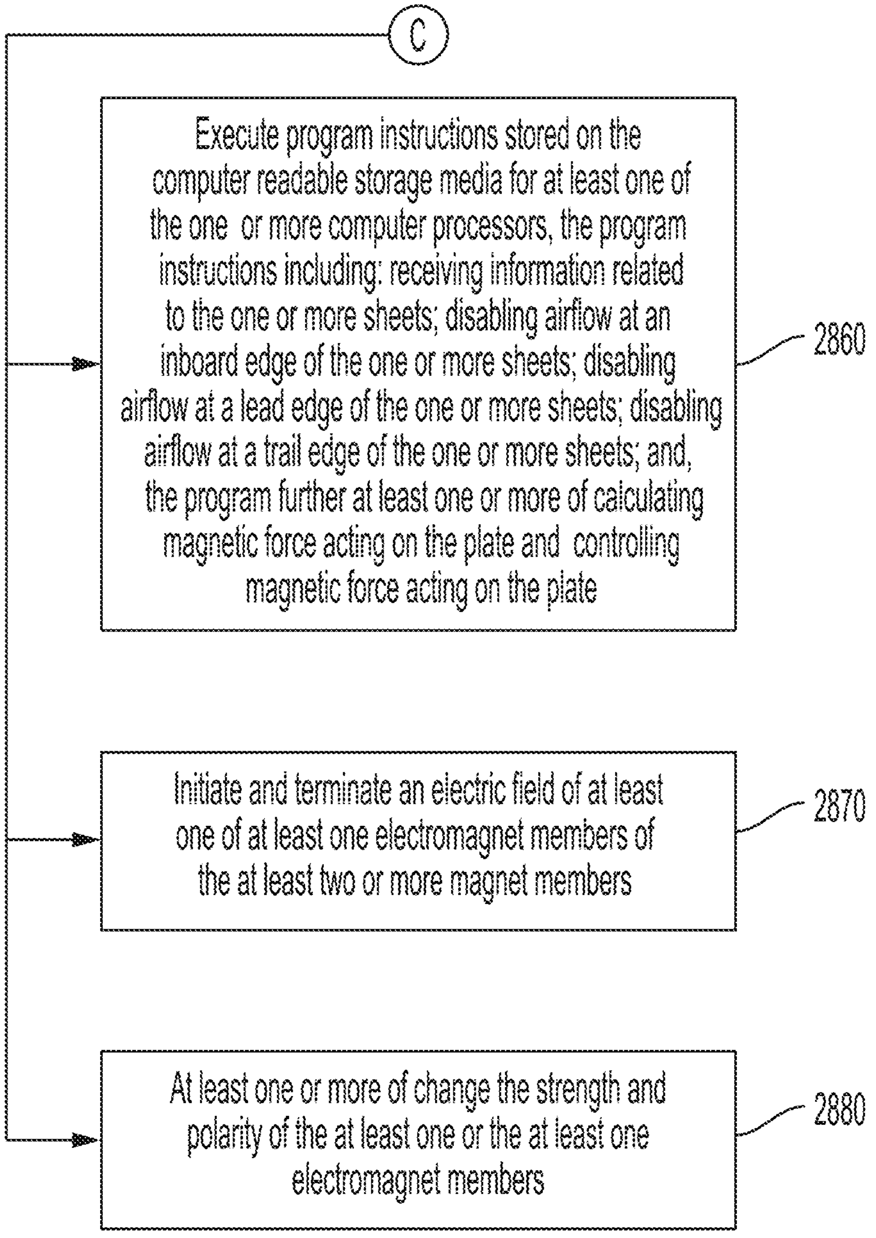

FIG. 28 illustrates that another representative added embodiment is a representative vacuum transport method, the method including the step of 2800, commencing operating the vacuum transport having a platen 20, the platen 20 including the first top surface 121A; the first bottom surface 121B; the one or more through-holes 124A; and the valve assembly 50. The added embodiment further includes the step of 2810, displacing the plate 52 relative to the first bottom surface 121B the plate 52 aligned with the one or more through-holes, the through-holes 124A linearly and parallelly arrayed in rows, the plate 52 including: the second top surface 54; the second bottom surface 56; the first end 58 fixedly secured to the first bottom surface 121B; and, the second end 60; and at least two or more magnet members 250A-250E arrayed longitudinally on each side of each row, the first second end 64 connected to the second end 60.

The added representative vacuum transport method may further include the step of 2820 engaging in a closed state of the valve assembly 50, the second top surface 54 or the first bottom surface 121B to close the one or more holes 124A; and disengaging in an open state of the valve assembly 50, the second top surface 54 from the first bottom surface 121B such that the one or more holes 124A are open.

The representative method may further include the step of 2830, controlling airflow along sheet 1 edges on a vacuum transport assembly comprising the platen 20 including one or more holes 124A arranged in rows in a cross-process direction, and a belt displaceable with respect to the platen 20 in a process direction. The method may further include the step of 2840, enabling airflow through the one or more holes 124A, disengaging therefore, the plate 52 from one or more magnet members 250A-250E; receiving information related to one or more sheets 1 of a print job; based on the information, disabling airflow through the one or more holes 124A at an inboard edge of the one or more sheets 1, engaging therefore, the plate 52 to one or more magnet members 250A-250E; based on the information, disabling airflow through the one or more holes at a lead edge of the one or more sheets; and, based on the information, disabling airflow through the one or more holes 124A at a trail edge of the one or more sheets 1.

The added vacuum transport method may further include the step of 2850, engaging in a closed state of the valve assembly 50, the second top surface 54 with the first bottom surface 121B to close the one or more holes 124A; and engaging with the at least two or more magnet members 250A-E further the top surface 54 of the valve assembly 50 to draw the valve assembly 50 toward the bottom surface 56 to close the one or more holes 124A.

The method may further include the step of 2860, executing program instructions stored on the computer readable storage media for, as illustrated in FIG. 19, by at least one of the one or more computer processors 404, the program instructions including: receiving information related to the one or more sheets 1; disabling airflow at an inboard edge of the one or more sheets; disabling airflow at a lead edge of the one or more sheets 1; disabling airflow at a trail edge of the one or more sheets 1; and, the program further at least one or more of calculating magnetic force acting on the plate 52 and controlling magnetic force acting on the plate 52.

Added embodiments of the vacuum transport method may further include the step of 2870, initiating and terminating an electric field of at least one of at least one electromagnet members 250C of the at least two or more magnet members 250C. Added embodiments of the vacuum transport method may further include the step of 2880, at least one or more of changing the strength and polarity of the at least one of the at least one electromagnet members 250C.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

1 Sheet
2A Inboard edge
2B Lead edge
2C Outboard edge
2D Trail edge
3 Stack
4 Stack edge
5 Sheet
6A Inboard edge
6B Lead edge
6C Outboard edge
6D Trail edge
10 Vacuum transport assembly
12 Vacuum
14 Belt
16 Rollers
18 Marker modules
18A Marker module
18B Marker module
18C Marker module
18D Marker module
20 Platen
22A Inboard side
22B Lead side
22C Outboard side
22D Trail side
24 Holes
25 Magnet hole
26A Zone
26B Zone
26C Zone
26D Zone
28 Registration edge
29 Line
30 Acquisition roller
32A Row or partition of holes
32B Row or partition of holes
34A Row or partition of holes
34B Row or partition of holes
36A Row or partition of holes
36B Row or partition of holes
38A Row or partition of holes
38B Row or partition of holes
50 Valve assembly
52 Leaf spring or valve or plate
52A Leaf spring or valve or plate
52B Leaf spring or valve or plate
54 Top surface
56 Bottom surface
58 End
60 End
62 Gasket
64 Actuator or motor or solenoid
64A Actuator
64B Actuator
66 Bracket
68 Shaft
70 Bracket
72 Connector or clamp or bar
80 Valve adjustment assembly
82 Fulcrum or pinch element or roller
84 Bracket or carriage
86 Actuator
88 Guide shaft
90 Shaft
92 Shaft
94 Spring
100 Actuator
102 Drive shaft
104 Belt and/or gear system
106 Shaft
108A Cam
108B Cam
110A Projection or raised lip
110B Projection or raised lip
112 Spring(s)
120 Platen
121A Top surface
121B Bottom surface
122A Inboard side
122B Lead side
122C Outboard side
122D Trail side
124A Holes
124B Channels
126A Zone
126B Zone
126C Zone
126D Zone
132A Row or partition of holes
132B Row or partition of holes
164 Actuator
182A Fulcrum or pinch element or roller
182B Fulcrum or pinch element or roller
210 Vacuum transport assembly
250A Plug magnet
250B Strip magnet
250C Electromagnet
250D Cube magnet
250E Donut magnet
260 Slot
300 Sheet edge airflow control environment
310 Network
320 Sensor
330 Input data
340 Airflow control program
350 Flowchart
352 Step
354 Step
356 Step
358 Step D1 Process direction
D2 Outboard cross process direction
D3 Inboard cross process direction
W1 Width
W2 Width

What is claimed is:

1. A vacuum transport assembly, comprising:
a platen, including:
a first top surface;
first bottom surface; and,
one or more through-holes; and,
a valve assembly, including:
a plate aligned with the one or more through-holes parallelly arrayed in rows, the plate including:
a second top surface;
a second bottom surface;
a first end fixedly secured to the first bottom surface; and,
a second end;
a first actuator connected to the second end; and
at least two or more magnet members arrayed on each side of each row.

2. The valve assembly as recited in claim 1, wherein: the valve adjustment assembly further comprises a carriage translatably connected to a second actuator; and, a fulcrum connected to the carriage.

3. The valve assembly as recited in claim 2, wherein the fulcrum is a roller.

4. The valve assembly as recited in claim 2, wherein the second actuator is a screw drive.

5. The valve assembly as recited in claim 1, wherein the plate is a leaf spring.

6. The vacuum transport assembly as recited in claim 1, wherein the first actuator is operatively arranged to displace the plate relative to the first bottom surface.

7. The vacuum transport assembly as recited in claim 1, wherein:
in a closed state of the valve assembly, the second top surface is engaged with the first bottom surface to close the one or more holes; and,
in an open state of the valve assembly, the second top surface is disengaged from the first bottom surface such that the one or more holes are open.

8. The vacuum transport assembly as recited in claim 7, wherein:
the at least two or more magnet members are adapted to engage with the top surface of the valve assembly to draw the valve assembly toward the first bottom surface to close the one or more holes.

9. The vacuum transport assembly as recited in claim 1, wherein:
the magnet members are magnetic insert members from at least one or more from a group of: plug members, cube members, and donut members.

10. The vacuum transport assembly as recited in claim 1, wherein:
the magnet members are magnetic strip members.

11. The vacuum transport assembly as recited in claim 1, wherein:
the magnet members are electromagnet members.

12. The vacuum transport assembly as recited in claim 11, wherein:
the electromagnet members are adapted to at least one or more of change strength and polarity.

13. The vacuum transport assembly as recited in claim 1, further comprising a valve adjustment assembly, including:
a fulcrum engaged with the second bottom surface; and,
a second actuator operatively arranged to displace the fulcrum with respect to the plate.

14. The vacuum transport assembly as recited in claim 13, wherein the fulcrum forces the plate into contact with the platen at a position along the plate such that:
a first portion of the plate extending from the first end to the position abuts against the first bottom surface; and,
a second portion of the plate extending from the position to the second end is displaceable with respect to the first bottom surface.

15. The vacuum transport assembly as recited in claim 1, wherein the first actuator is connected to the second end via a cam.

16. A method of controlling airflow along sheet edges on a vacuum transport assembly comprising a platen including one or more holes arranged in rows in a cross-process direction, and a belt displaceable with respect to the platen in a process direction, the method comprising:
enabling airflow through the one or more holes, disengaging therefore, a plate from one or more magnet members;
receiving information related to one or more sheets of a print job;
based on the information, disabling airflow through the one or more holes at an inboard edge of the one or more sheets, engaging therefore, the plate to one or more magnet members;
based on the information, disabling airflow through the one or more holes at a lead edge of the one or more sheets; and,
based on the information, disabling airflow through the one or more holes at a trail edge of the one or more sheets.

17. The vacuum transport method as recited in claim 16, the method including:
engaging in a closed state of the valve assembly, the second top surface with the first bottom surface to close the one or more holes; and,
engaging with the at least two or more magnet members further the top surface of the valve assembly to draw the valve assembly toward the bottom surface to close the one or more holes.

18. The method as recited in claim 16, the method further including:
executing program instructions stored on the computer readable storage media by at least one of the one or more computer processors, the program instructions including:
receiving information related to the one or more sheets;
disabling airflow at an inboard edge of the one or more sheets;
disabling airflow at a lead edge of the one or more sheets; and,
disabling airflow at a trail edge of the one or more sheets; and,
the program further at least one or more of calculating magnetic force acting on the plate and controlling magnetic force acting on the plate.

19. The vacuum transport method as recited in claim 18, the method further including initiating and terminating an electric field of at least one of at least one electromagnet members of the at least two or more magnet members.

20. The vacuum transport method as recited in claim 19, the method further including at least one or more of changing the strength and polarity of the at least one of the at least one electromagnet members.

* * * * *